(12) United States Patent
Sorimoto

(10) Patent No.: US 11,318,650 B2
(45) Date of Patent: May 3, 2022

(54) HOLDING UNIT AND MOLD EXTRUSION MECHANISM PROVIDED WITH HOLDING UNIT

(71) Applicant: Technocrats Corporation, Hiroshima (JP)

(72) Inventor: Masanori Sorimoto, Hiroshima (JP)

(73) Assignee: TECHNOCRATS CORPORATION, Hiroshima (JP)

( * ) Notice: Subject to any disclaimer, the term of this patent is extended or adjusted under 35 U.S.C. 154(b) by 36 days.

(21) Appl. No.: 16/719,755

(22) Filed: Dec. 18, 2019

(65) Prior Publication Data

US 2020/0122375 A1 Apr. 23, 2020

Related U.S. Application Data

(63) Continuation of application No. PCT/JP2018/038369, filed on Oct. 15, 2018.

(51) Int. Cl.
 *B29C 45/44* (2006.01)
(52) U.S. Cl.
 CPC .................. *B29C 45/44* (2013.01)
(58) Field of Classification Search
 CPC ........ B29C 45/44; B29C 33/44; B29C 33/442
 USPC .................................................. 425/DIG. 58
 See application file for complete search history.

(56) References Cited

U.S. PATENT DOCUMENTS

| 2,758,625 A | 8/1956 | Jules |
| 4,279,586 A | 7/1981 | Yamashita |
| 4,573,902 A * | 3/1986 | Heilman ............... B29C 33/202 264/236 |
| 5,511,269 A | 4/1996 | Watson |
| 6,491,513 B1 * | 12/2002 | Schneider ........... B29C 45/4435 425/438 |
| 9,358,713 B2 * | 6/2016 | Olaru .................... B29C 45/281 |

(Continued)

FOREIGN PATENT DOCUMENTS

| CN | 202029334 U | 11/2011 |
| CN | 204471759 U | 7/2015 |

(Continued)

OTHER PUBLICATIONS

PCT International Preliminary Report on Patentability for International Application No. PCT/JP2018/038369, entitled "Holding Unit and Mold Extrusion Mechanism Provided with Holding Unit," dated Apr. 14, 2021.

(Continued)

*Primary Examiner* — Alison L Hindenlang
*Assistant Examiner* — Asha A Thomas
(74) *Attorney, Agent, or Firm* — Hamilton, Brook, Smith & Reynolds, P.C.

(57) ABSTRACT

A retaining unit includes: a movable ejector pin; a ring-shaped member used in a fixed state; and a ball plunger directly attached to the ejector pin or fixed to a fixing member attached to the ejector pin. The ball plunger is configured to press the ring-shaped member and engage the ejector pin with the ring-shaped member. When a force at a predetermined level or higher is applied to the ejector pin in a movement direction of the ejector pin, the engagement with the ring-shaped member is released so that the ejector pin is allowed to move. The ball plunger is incorporated into the ejector pin or the fixing member so as to be unitized together.

15 Claims, 17 Drawing Sheets

(56) References Cited

U.S. PATENT DOCUMENTS

2012/0070525 A1    3/2012   Wang et al.
2018/0147763 A1    5/2018   Sorimoto

FOREIGN PATENT DOCUMENTS

| | | |
|---|---|---|
| DE | 20217617 U1 | 2/2003 |
| JP | 56-025432 A | 3/1981 |
| JP | 58-078735 A | 5/1983 |
| JP | 63-197620 A | 8/1988 |
| JP | 03-072416 | 7/1991 |
| JP | 10-016014 A | 1/1998 |
| JP | 2014-097628 A | 5/2015 |
| JP | 2018-086749 A | 6/2018 |
| KR | 20000056095 A | 8/2002 |

OTHER PUBLICATIONS

PCT International Search Report for International Application No. PCT/JP2018/038369, entitled "Holding Unit and Mold Extrusion Mechanism Provided with Holding Unit," dated Nov. 20, 2018.

\* cited by examiner

HOLDING UNIT AND MOLD EXTRUSION MECHANISM PROVIDED WITH HOLDING UNIT

CROSS REFERENCE TO THE RELATED APPLICATION

This application is a continuation application, under 35 U.S.C. § 111(a) of international patent application No. PCT/JP2018/038369, filed Oct. 15, 2018, the entire disclosure of which is herein incorporated by reference as a part of this application.

BACKGROUND OF THE INVENTION

Field of the Invention

The present invention relates to a retaining unit, an ejection mechanism of a forming mold including such a retaining unit, a fixed-side die, a movable-side die, a forming mold, and a molded product.

Description of Related Art

An injection mold having a two-stage ejection mechanism has been known. A conventional two-stage ejection mechanism has been known in which: first and second ejector pins are attached to first and second ejector plates, respectively; a molded product is ejected by the first ejector pin; thereafter, the second ejector plate is pushed up by the first ejector plate; and the molded product is ejected by the second ejector pin. However, since the two ejector plates are used, it is difficult to reduce the size.

In order to solve the problem of the two-stage ejection mechanism having two ejector plates, developed is a two-stage ejection mechanism having one ejector plate and an ejector pin which is detachably attached to the ejector plate and of which the movement amount is restricted (see, for example, Patent Document 1).

The two-stage ejection mechanism described in Patent Document 1 has a feature that the ejector pin and the ejector plate are detachably connected with each other via a magnetic force. Thus, it is possible to move the ejector pin and the ejector plate integrally, and it is also possible to move only the ejector plate while restricting movement of the ejector pin. In other words, this attachment/detachment mechanism of the ejector pin and the ejector plate is a retaining mechanism that retains the connected state of the ejector pin and the ejector plate until reaching a predetermined position.

RELATED DOCUMENT

Patent Document

[Patent Document 1] JP Laid-open Patent Publication No. 2014-097628

In the case of using the mold with the retaining mechanism attached thereto, ease of incorporation thereof is important. However, no retaining mechanisms in which ease of incorporation is particularly considered have thus far been found, including Patent Document 1. In addition, considering incorporation into the mold or the like, a compactible structure and versatility may also be important for the retaining mechanism. For example, the retaining mechanism using a magnetic force is simple in structure, and therefore, preferable for compactification of the mold. However, since the magnetic force cannot be changed, it is necessary to, for respective molds, prepare retaining mechanisms having magnetic forces suited thereto. Thus, there is a room for improvement in usability, including versatility.

SUMMARY OF THE INVENTION

An object of the present invention is to provide a retaining unit that can be easily incorporated into a mold and has high versatility. Another object of the present invention is to provide a retaining unit that can be compactly incorporated into a mold, an ejection mechanism of a forming mold including such a retaining unit, a fixed-side die, a movable-side die, a forming mold, and a molded product.

A retaining unit according to the present invention includes: a first member configured to be movable; a second member used in a fixed state; and a pressing unit directly attached to the first member or fixed to a fixing member attached to the first member, the pressing unit being configured to press the second member and engage the first member with the second member, in which case the pressing unit is configured to release the engagement with the second member so that the first member is allowed to move, when a force at a predetermined level or higher is applied in a movement direction of the first member, and the pressing unit is incorporated into the first member or the fixing member so as to be unitized together.

In the retaining unit of the present invention, the second member may have a recess into which at least a distal end portion of the pressing unit is fitted, and the pressing unit may press the second member with at least the distal end portion thereof fitted into the recess.

In the retaining unit of the present invention, the pressing unit may be detachably incorporated into the first member or the fixing member.

In the retaining unit of the present invention, the pressing unit may be configured such that a pressing force thereof to the second member is adjustable in a state in which the pressing unit is incorporated into the first member or the fixing member.

In the retaining unit of the present invention, the pressing unit may be incorporated into the first member or the fixing member via a fixture, and the fixture may function to adjust the pressing force of the pressing unit.

In the retaining unit of the present invention, the fixing member may be larger in outer diameter than the first member.

In the retaining unit of the present invention, the second member may be a ring-shaped member provided so as to surround a pressed portion of the first member or the fixing member, one or more of the pressing unit may be incorporated into the first member or the fixing member, and each pressing unit may be configured such that a distal end portion thereof is projectable from an outer circumferential surface of the first member or the fixing member.

In the retaining unit of the present invention, the pressing unit may be a ball plunger, a plate spring or an elastic body that has a distal end provided with an engagement portion to be engaged with the second member.

In the retaining unit of the present invention, the first member may be used in a fixed state, and the second member may be movable.

An ejection mechanism of a forming mold according to the present invention, in which the retaining unit is incorporated, and which is used for molding a molded product by a fixed-side die and a movable-side die, comprises an ejector plate, wherein the second member is fixed to the ejector plate, and the first member functions as an ejector pin.

The ejection mechanism of the forming mold of the present invention may further include one or a plurality of biasing unit configured to energize the first member toward a position where the first member is engaged with the second member, wherein the ejector plate may have a recess into which the second member is fitted, and the second member may be fixedly fitted into the recess.

The ejection mechanism of the forming mold of the present invention may further include a holder which houses the biasing unit, wherein the holder may have: an outer holder attached to the movable-side die or the ejector plate; and an inner holder slidably engaged with the outer holder, and the holder may restrict a sliding amount of the inner holder relative to the outer holder, thereby to restrict an extension amount of the biasing unit within a predetermined range.

In the ejection mechanism of the forming mold of the present invention, the first member may be configured such that, when the ejector plate is moved to a predetermined position, the first member is connected with a movable-side die plate and is kept at the predetermined position.

In the ejection mechanism of the forming mold of the present invention, the forming mold may include an undercut processing mechanism, and the first member may be an ejector pin configured to push out the undercut processing mechanism.

The ejection mechanism of the forming mold of the present invention may further include one or more ejector pins fixed to the ejector plate or include a plurality of the retaining units incorporated into the ejector plate, wherein the ejection mechanism of the forming mold may be capable of multi-stage ejection.

A fixed-side die and/or a movable-side die according to the present invention includes the ejection mechanism of the forming mold.

A forming mold according to the present invention includes the fixed-side die and/or the movable-side die.

A molded product according to the present invention is molded by the fixed-side die and/or the movable-side die, or by the forming mold.

According to the present invention, the retaining mechanism is unitized, and therefore, can be easily incorporated into the mold and has high usability. In addition, the retaining unit of the present invention is configured such that the pressing unit for engaging the first member with the second member is attachable and detachable, and the pressing force thereof is adjustable in a state in which the pressing unit is incorporated into the first member. Therefore, the retaining unit can be used by being incorporated into various molds and the like, and thus has high versatility. In addition, in the ejection mechanism of the forming mold, the recess is provided to the ejector plate, and the second member of the retaining unit is attached to the recess, whereby the ejection mechanism of the forming mold, and the forming mold itself can be made compact.

As described above, according to the present invention, it is possible to provide a retaining unit that can be easily incorporated into a mold and has high versatility, a retaining unit that can be compactly incorporated into a mold, an ejection mechanism of a forming mold including such a retaining unit, a fixed-side die, a movable-side die, and a forming mold.

DESCRIPTION OF EMBODIMENTS

Figure 1:
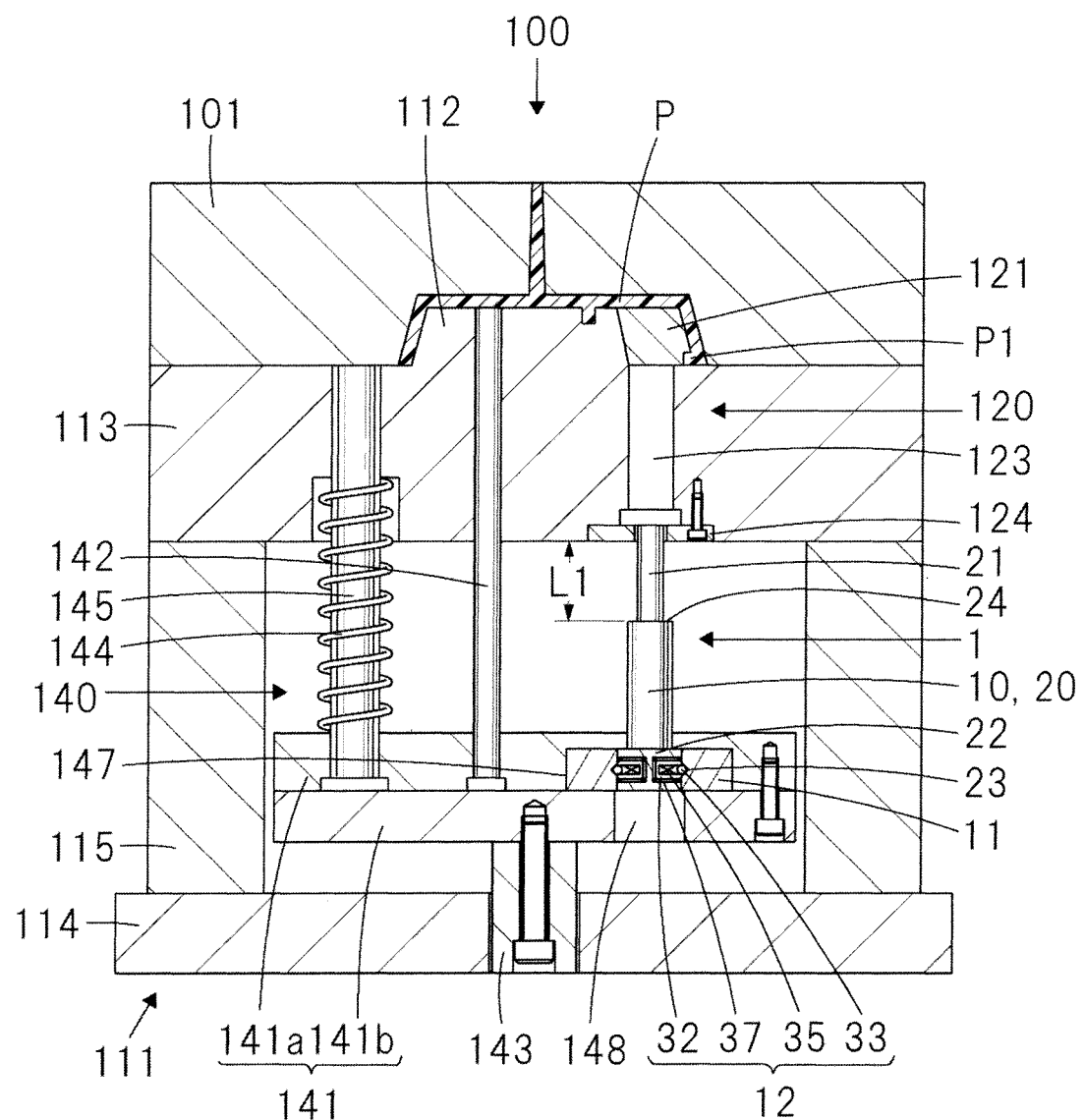
FIG. 1 is a sectional view of a main part of an injection mold 100 including a retaining unit 1 according to the first embodiment of the present invention, at the time of mold clamping.
Figure 2:
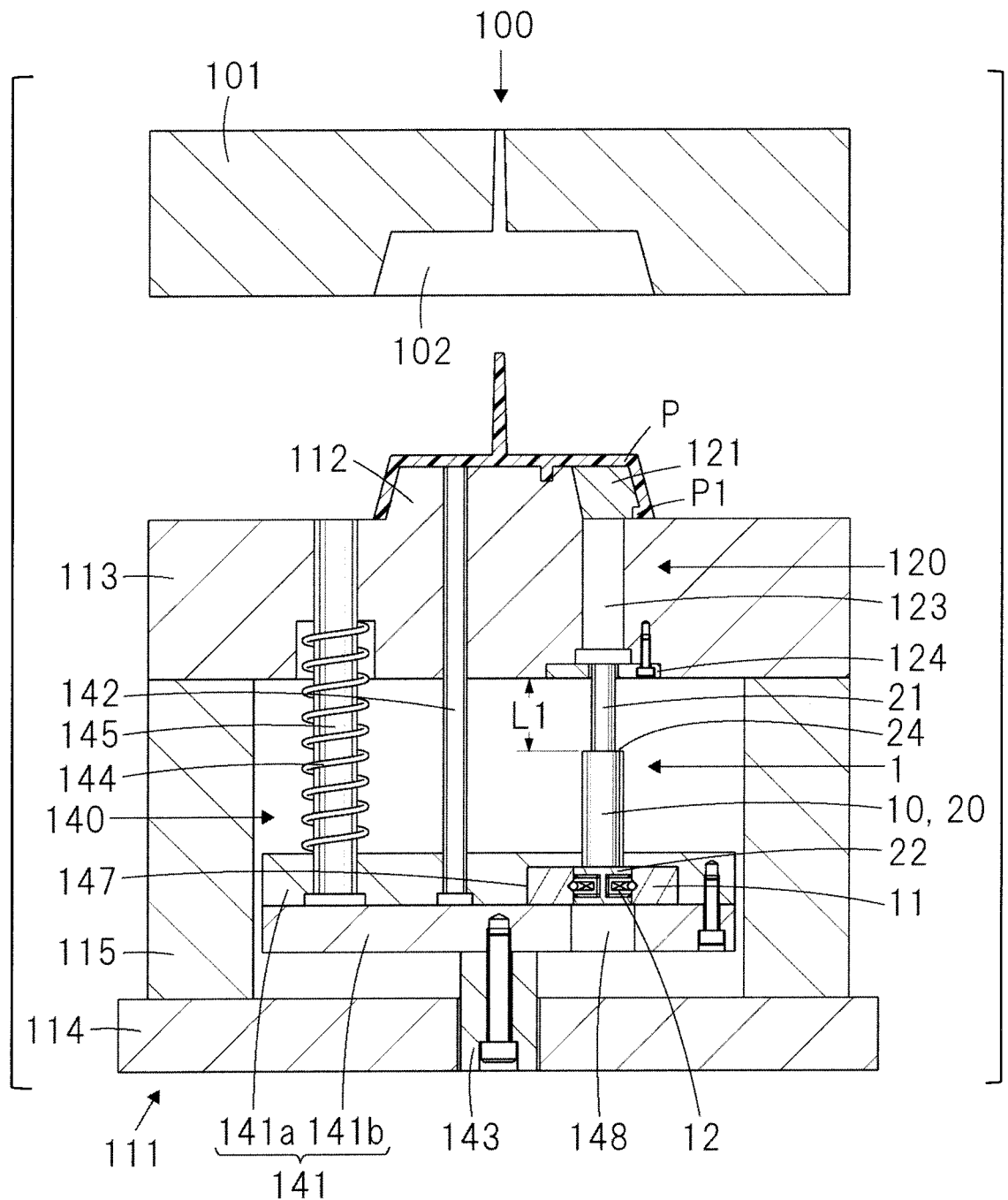
FIG. 2 is a sectional view of a main part of the injection mold 100 shown in FIG. 1 after mold opening.
Figure 3:
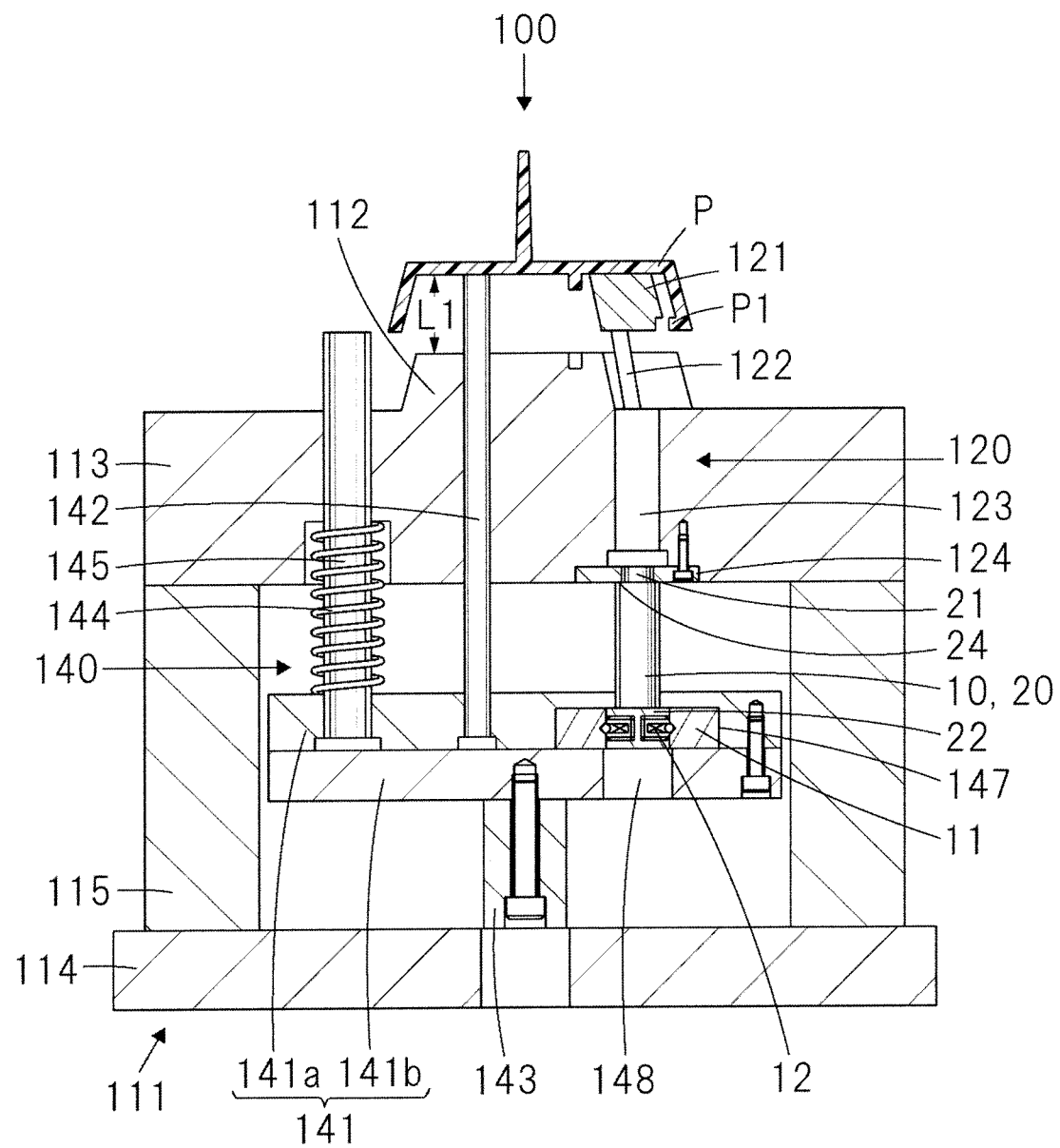
FIG. 3 is a sectional view of a main part of the injection mold 100 shown in FIG. 1 after ejection operation in a first stage.
Figure 4:
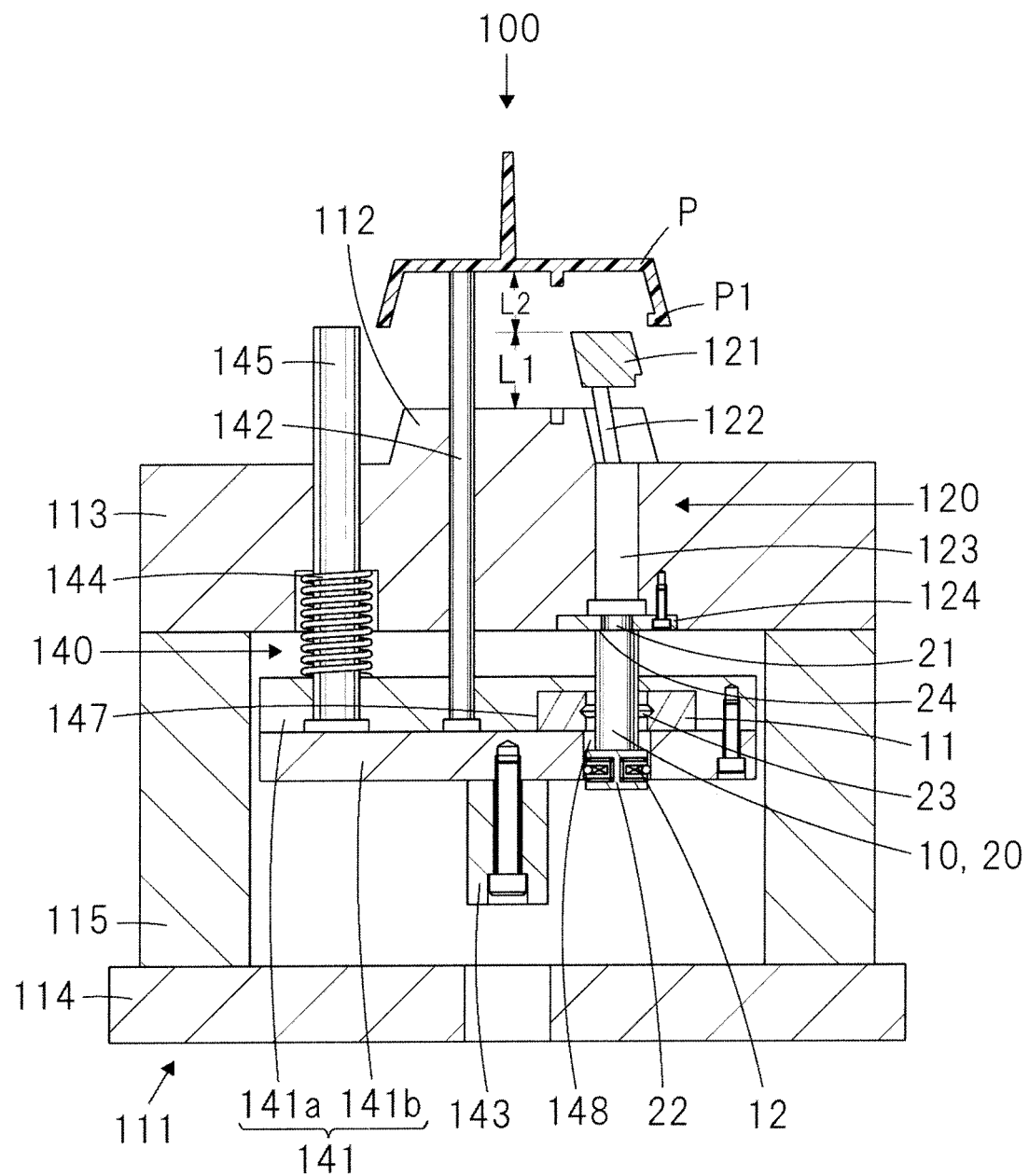
FIG. 4 is a sectional view of a main part of the injection mold 100 shown in FIG. 1 after ejection operation in a second stage.
Figure 5A:
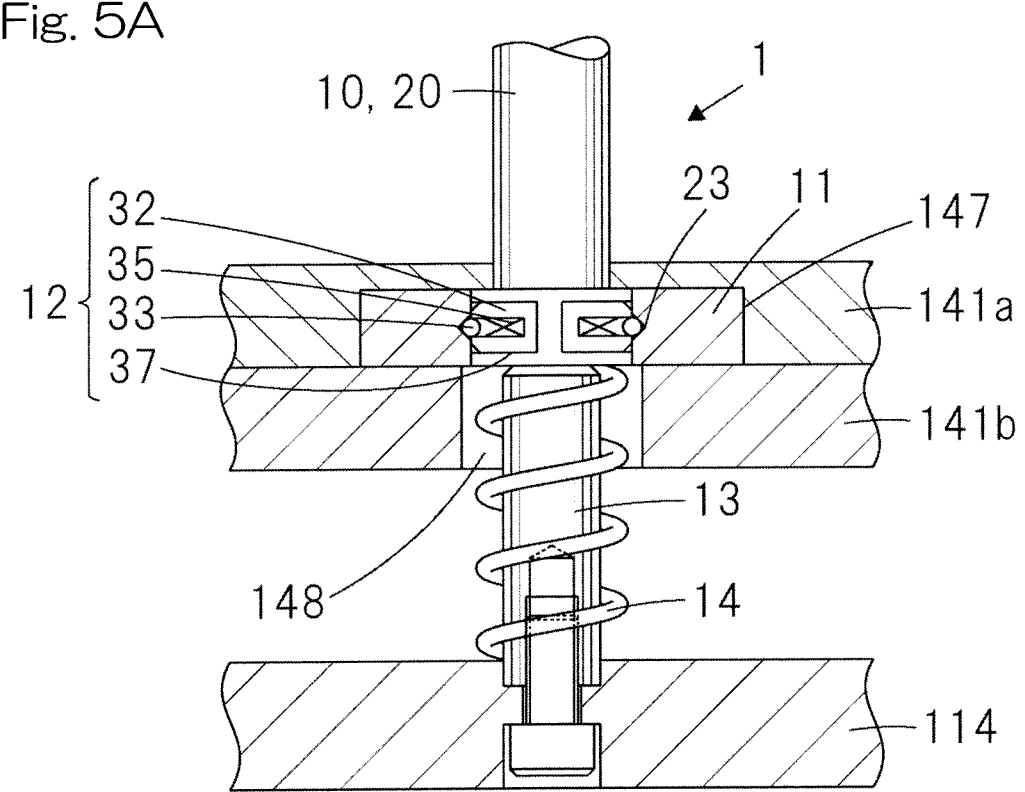
FIGS. 5A and 5B are sectional views each illustrating a main part of the injection mold 100 shown in FIG. 1, in which a stopper 13 for the retaining unit 1 is added.
Figure 5B:
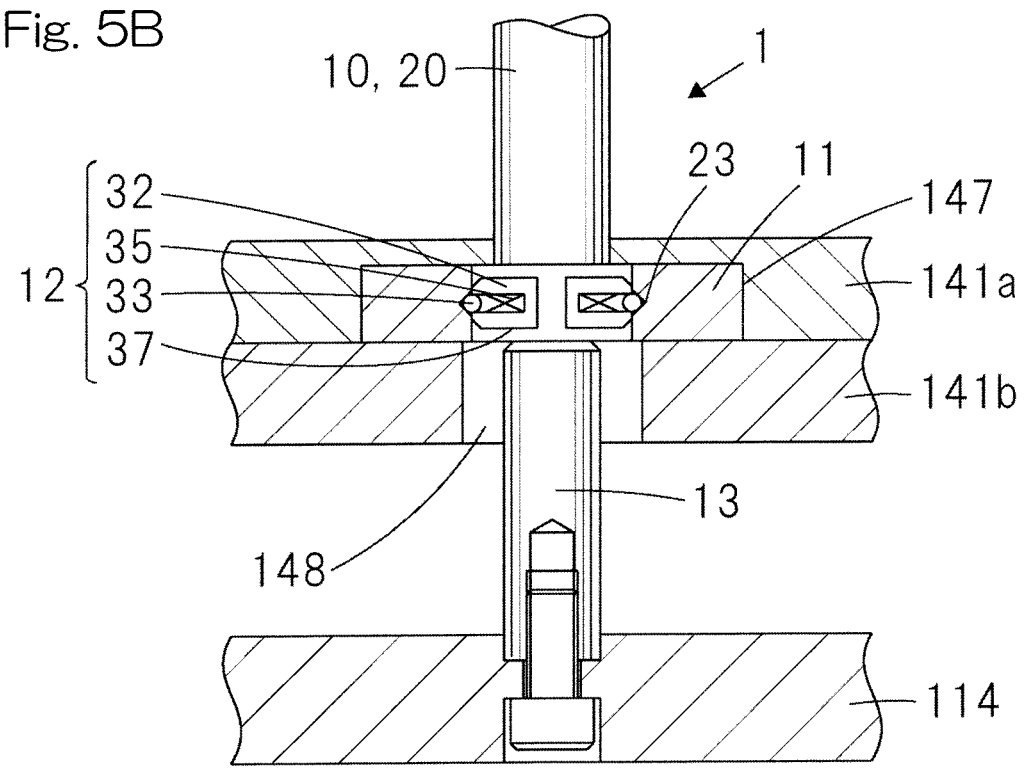

FIG. 1 is a sectional view of a main part of an injection mold 100 including a retaining unit 1 according to a first embodiment of the present invention, at the time of mold clamping. FIG. 2 is a sectional view of a main part of the injection mold 100 shown in FIG. 1 after mold opening. FIG. 3 is a sectional view of a main part of the injection mold 100 shown in FIG. 1 after ejection operation in a first stage. FIG. 4 is a sectional view of a main part of the injection mold 100 shown in FIG. 1 after ejection operation in a second stage. FIG. 5A and FIG. 5B are sectional views of a main part of the injection mold 100 shown in FIG. 1, in which a stopper 13 for the retaining unit 1 is added. In FIG. 3 and FIG. 4, a fixed-side die 101 is not shown.

The injection mold 100 includes the fixed-side die 101 having a cavity 102 forming a molding surface, and a movable-side die 111 having a core 112 forming a molding surface, and molds a molded product P. The retaining unit 1 according to the first embodiment of the present invention is incorporated into the movable-side die 111 of the injection mold 100, and enables two-stage ejection in ejection operation for the molded product P.

The retaining unit 1 includes: an ejector pin 10 which is a movable first member; a ring-shaped member 11 which is a second member used in a fixed state; ball plungers 12 which are pressing unit for engaging the ejector pin 10 with the ring-shaped member 11; and a ball plunger fixing member 22 (hereinafter, referred to as fixing member 22) which is a pressing unit fixing member attached to a lower end (bottom portion) of the ejector pin 10. The ball plungers 12 fixed to the fixing member 22 press the ring-shaped member 11, and the ejector pin 10 is attachable and detachable relative to the ring-shaped member 11 via the ball plungers 12 fixed to the fixing member 22.

The movable-side die 111 includes: a movable-side die plate 113 having a core 112 formed thereon; a movable-side attachment plate 114 for attaching the movable-side die 111 to a mold-clamping-mechanism-side die plate (not shown) of an injection molding machine; and a spacer block 115 placed between the movable-side die plate 113 and the movable-side attachment plate 114, to ensure a movable area for the ejection mechanism 140.

The movable-side die 111 further includes an undercut processing mechanism 120. Here, an undercut P1 is an inner undercut. The undercut processing mechanism 120 includes: a molding piece 121 for molding the undercut P1; an undercut molding unit 123 which has an inclined pin 122 and moves the molding piece 121 in a direction perpendicular to the ejection direction; and a fixation plate 124 fixing the undercut molding unit 123 to the movable-side die plate 113 and made of magnet. The distal end of the ejector pin 10 which is the first member of the retaining unit 1 is connected and fixed to the proximal end of the undercut molding unit 123.

The movable-side die 111 further includes an ejection mechanism 140 for ejecting the molded product P and the molding piece 121. The ejection mechanism 140 includes an ejector plate 141 and an ejector pin 142 which is fixed to the ejector plate 141 and ejects the molded product P. An ejector rod 143 which transmits power for ejection applied via an ejection mechanism (not shown) of the injection molding machine, to the ejector plate 141, is fastened to the ejector plate 141 with use of a bolt. In addition, a return pin 145, which is inserted through a compression coil spring 144 and which returns the ejector plate 141 to a position before ejection, is fixed to the ejector plate 141.

The ejector plate 141 includes an upper ejector plate 141a and a lower ejector plate 141b, both of which are fastened with each other with use of a bolt to form one ejector plate. The ejector plate 141 has a counterbored plate structure, and sandwiches the flanges of the bottom portions of the return pin 145 and the ejector pin 142 for ejecting the molded product P, thereby fixing them, and sandwiches the ring-shaped member 11 of the retaining unit 1 so as to be fitted into a recess 147 formed in the upper ejector plate 141a, thereby fixing the ring-shaped member 11. The lower ejector plate 141b has an insertion hole 148 penetrating therethrough so as to allow the fixing member 22 attached to the lower end of the ejector pin 10 described later to be inserted therethrough.

The ejector pin 10 forms the movable first member of the retaining unit 1 and is used for ejecting the molding piece 121. Unlike the ejector pin 142 which directly ejects the molded product P, the ball plungers 12 fixed to the fixing member 22 attached to the lower end of the ejector pin 10 are engaged with the ring-shaped member 11 which is unmovably fixed to the ejector plate 141, whereby the ejector pin 10 is detachably connected with the ejector plate 141. Such an attachment/detachment mechanism for the ejector pin 10 and the ejector plate 141 via the ball plungers 12 will be described.

The ejector pin 10 is a straight-type stepped pin and has a distal end portion 21 which is thinner than a body portion 20 at a center thereof. The fixing member 22 which is larger than the body portion 20 is fixed to the lower end of the ejector pin 10. The distal end portion 21 of the ejector pin 10 is fixed to the proximal end of the undercut molding unit 123 so as to enable ejection or retraction of the molding piece 121 of the undercut processing mechanism 120, and the ejector pin 10 is detachably connected with the ring-shaped member 11 via the ball plungers 12 fixed to the fixing member 22.

The fixing member 22 is a columnar member for fixing the ball plungers 12 which form the pressing unit, and has an outer diameter smaller than the inner diameter of the ring-shaped member 11. The fixing member 22 is detachably fixed to the lower end of the ejector pin 10 with a bolt (not shown). In the fixing member 22, four ball plungers 12 which form the pressing unit for engaging the ejector pin 10 with the ring-shaped member 11 are incorporated so as to be arranged at 90-degree intervals in the circumferential direction, such that the distal ends of the ball plungers 12 are projectable from the outer circumferential surface so as to face the ring-shaped member 11 side.

The length of the body portion 20 of the ejector pin 10 is set so that the movement amount (stroke amount) of the ejector pin 10 becomes a distance L1 required for moving the molding piece 121 to pull out the undercut.

The ring-shaped member 11 is larger than the outer diameter of the fixing member 22 attached to the lower end of the ejector pin 10, and the inner circumferential surface of the ring-shaped member 11 has, over the entire circumference thereof, a recess 23 having a groove shape to which balls 33 provided at the distal ends of the ball plungers 12 as described later are fitted. Owing to the actions of the recess 23 of the ring-shaped member 11 and the ball plungers 12, the ejector pin 10 is detachably connected with the ring-shaped member 11, i.e., the ejector plate 141, via the ball plungers 12. It is noted that the recess 23 is not limited to the groove provided over the entire circumference. For example, in the case where rotation of the ejector pin 10 around the center axis is restricted, the recess 23 may be formed as a dent provided at a position corresponding to each ball plunger 12.

Each ball plunger 12 includes: a bottomed and cylindrical body 32 having a bottom; the ball 33 provided in the body 32 so as not to come off from the distal end of the body 32; and a compression coil spring 35 provided in the body 32 and energizing the ball 33 toward the distal end. The balls 33 are fitted into the recess 23 of the ring-shaped member 11, whereby the ejector pin 10 is engaged with the ring-shaped member 11.

The ball plunger 12 has, as a fixture, a thread formed on an outer circumferential surface 37 of the body 32 so as to be screwed with a female thread portion formed in the radial direction on the fixing member 22, whereby the ball plunger 12 is attachable and detachable relative to the fixing member 22. Each female thread portion of the fixing member 22 is formed in a recessed portion provided so as to face the outer circumferential surface side of the fixing member 22.

Screwing of the ball plunger 12 to the female thread portion and adjustment of the screwing amount thereof may be performed by operating the distal end side of the ball plunger 12 (ball 33 side) with an appropriate tool. Thus, it is possible to adjust the protrusion amount of each ball plunger 12 from the outer circumferential surface of the fixing member 22 by the screwing amount, and through this adjustment, the pressing force of the ball plunger 12 can be adjusted. Preferably, loosening of the ball plungers 12 is prevented by a set screw, an adhesive agent, or the like after adjustment of the pressing force.

The shapes of the fixing member 22 and the ring-shaped member 11, and the number and the arrangement of the ball plungers 12, are not particularly limited, but may be changed within a range that does not deviate from the gist. For example, the fixing member 22 and the ring-shaped member 11 may have polygonal sectional shapes. One to three ball plungers 12 or five or more ball plungers 12 may be incorporated into the fixing member 22.

Regarding the ejector pin 10 attached to the ejector plate 141 in the above manner, when the ejector pin 10 is pushed upward in FIG. 1 against the ejector plate 141, the balls 33 of the ball plungers 12 are fitted into the recess 23 provided in the ring-shaped member 11, and the fixing member 22 is engaged and connected with the ring-shaped member 11, whereby the ejector pin 10 is connected with the ejector plate 141. On the other hand, if the ejector pin 10 is pushed downward in FIG. 1 by a force at a certain level or higher, the balls 33 of the ball plungers 12 are detached from the recess 23 of the ring-shaped member 11, whereby engagement of the fixing member 22 with the ring-shaped member 11 is released, and thus, the ejector pin 10 can freely move relative to the ejector plate 141.

A force when the fixing member 22 and the ring-shaped member 11 connected with each other via the ball plungers 12 are disconnected from each other, needs to be greater than a reaction force when, in a state in which the fixing member 22 is connected with the ring-shaped member 11, the ejector plate 141 is ejected to cause the ejector pin 10 to move the molding piece 121. If the force when the fixing member 22 and the ring-shaped member 11 connected with each other via the ball plungers 12 are disconnected from each other is smaller than the reaction force when the molding piece 121 is moved, the ejector pin 10 (fixing member 22) is detached from the ring-shaped member 11 when the ejector plate 141 is ejected. Thus, only the ejector plate 141 moves, and as a result, the molding piece 121 cannot be ejected.

In addition, the force when the fixing member 22 and the ring-shaped member 11 connected with each other via the ball plungers 12 are disconnected from each other needs to be smaller than power for ejection applied via an ejection device (not shown) of the injection molding machine. Thus, in a state in which the ejector pin 10 (fixing member 22) and the ejector plate 141 (ring-shaped member 11) are connected with each other, if the ejector plate 141 is ejected and a step portion 24 on the distal end side of the body portion 20 of the ejector pin 10 abuts on the fixation plate 124, the connection between the ejector pin 10 (fixing member 22) and the ejector plate 141 (ring-shaped member 11) can be released.

In addition, a force needed for the balls 33 of the ball plungers 12 to be fitted into the recess 23 of the ring-shaped member 11 so as to be connected therewith again from a state in which the fixing member 22 and the ring-shaped member 11 are detached from each other, is set to be smaller than an attraction force due to a magnetic force between the step portion 24 of the body portion 20 of the ejector pin 10 and the fixation plate 124. Thus, at the time of mold clamping, the ejector pin 10 (fixing member 22) is connected with the ring-shaped member 11 before the step portion 24 of the body portion 20 of the ejector pin 10 is detached from the fixation plate 124. Therefore, the ejector pin 10 is prevented from coming into an unconstrained state, and unintended movement of the ejector pin 10 is prevented.

As shown in FIG. 5A and FIG. 5B, a stopper 13 for pushing the bottom surface of the fixing member 22 may be provided to the movable-side attachment plate 114 so that the ejector pin 10 (fixing member 22) is assuredly connected with the ring-shaped member 11 when the ejector plate 141 is returned to a mold clamping position. Further, a compression coil spring 14 for energizing the ejector pin 10 (fixing member 22) toward the distal end side may be attached to the stopper 13 (see FIG. 5A).

Operation of the injection mold 100 at the time of ejection of a molded product, and actions of the ejection mechanism 140 and the retaining unit 1, will be described. The injection mold 100 undergoes an injection step and a cooling step (see FIG. 1), and then mold opening (see FIG. 2), and an ejection step (see FIG. 3, FIG. 4) for the molded product P. The movable-side die 111 is retracted via a mold clamping device (not shown), whereby mold opening is performed, and a space for extracting the molded product P is formed between the fixed-side die 101 and the movable-side die 111. This state is a state shown in FIG. 2, and the fixing member 22 attached to the lower end of the ejector pin 10 is engaged with the ring-shaped member 11 fixed to the ejector plate 141, via the ball plungers 12. That is, the ejector pin 10 and the ejector plate 141 are connected with each other via the fixing member 22, the ring-shaped member 11, and the ball plungers 12.

In the ejection step, the ejector rod 143 advances by receiving power of the ejection device (not shown) of the injection molding machine, and the ejector plate 141 connected with the ejector rod 143 is ejected in an ejection direction (upward in FIG. 3) of the molded product P. Thus, as well as the ejector pin 142 fixed thereto, the ejector pin 10 connected with the ejector plate 141 is moved in the ejection direction, whereby the ejector pin 142 ejects the molded product P and the ejector pin 10 ejects the molding piece 121.

When the ejector plate 141 is ejected by the distance L1, the step portion 24 of the body portion 20 of the ejector pin 10 abuts on the fixation plate 124, whereby movement of the ejector pin 10 is prevented. FIG. 3 shows a state in which the step portion 24 of the body portion 20 of the ejector pin 10 abuts on the fixation plate 124. At this time, the molding piece 121 moves leftward in FIG. 3, and thus the undercut is detached. When the step portion 24 of the body portion 20 of the ejector pin 10 abuts on the fixation plate 124, the ejector pin 10 is attracted to the fixation plate 124 by a magnetic force.

When the step portion 24 of the body portion 20 of the ejector pin 10 abuts on the fixation plate 124, the ejector pin 10 stops moving, but the ejector plate 141 continues advancing. At this time, the ejection force applied to the ejector plate 141 by the ejection device of the injection molding machine is greater than the force required for the ejector pin 10 (fixing member 22) to be detached from the ring-shaped member 11 (ball plungers 12), and therefore, connection between the ejector pin 10 and the ejector plate 141 (ring-shaped member 11) is disconnected, and the ejector plate 141 continues advancing while sliding on the outer circumferential surface of the body portion 20 of the ejector pin 10. Although the ejector pin 10 is disconnected from the ejector plate 141, the ejector pin 10 is connected with the movable-side die plate 113 by being attracted to the fixation plate 124, and thus stays at that position.

The maximum ejection amount of the ejector plate 141 is a distance of L1+L2 from the original position, and the ejector pin 142 fixed to the ejector plate 141 also moves by the distance of L1+L2 from the original position, thereby ejecting the molded product P. FIG. 4 shows a state in which the ejector pin 142 is maximally ejected.

When ejection of the molded product P is finished, a mold clamping step is performed. In the mold clamping step, the ejection device (not shown) of the injection molding machine is retracted from the movable-side die plate 113 side to the movable-side attachment plate 114 side. The ejector plate 141 for which ejection power from the ejection device of the injection molding machine has been lost is retracted from the movable-side die plate 113 side to the movable-side attachment plate 114 side by an elastic force of the compression coil spring 144. At this time, the ejector plate 141 continues retracting while sliding on the outer circumferential surface of the body portion 20 of the ejector pin 10. Just before the ejector plate 141 retracts by the distance L2 from the maximum ejection position, the balls 33 of the ball plungers 12 fixed to the fixing member 22 come into contact with an edge of the ring-shaped member 11, and in this state, the ejector plate 141 further retracts.

At this time, the force required for the balls 33 of the ball plungers 12 to be fitted into the recess 23 of the ring-shaped member 11 from the state in which the fixing member 22 and the ring-shaped member 11 are detached from each other, is set to be smaller than the attraction force due to a magnetic force between the step portion 24 of the body portion 20 of the ejector pin 10 and the fixation plate 124. Therefore, when the ejector plate 141 has retracted by the distance L2 from the maximum ejection position, the ejector pin 10 (fixing member 22) and the ejector plate 141 (ring-shaped member 11) are connected with each other, and thereafter, the connection between the step portion 24 of the body portion 20 of the ejector pin 10 and the fixation plate 124 is disconnected.

Thereafter, in the state in which the ejector pin 10 (fixing member 22) and the ejector plate 141 (ring-shaped member 11) are connected with each other, the ejector plate 141 further retracts, and finally, the distal end of the return pin 145 contacts with the fixed-side die 101, and the ejector plate 141 is pushed back to the original position before ejection.

In the present embodiment, a flange (not shown) for increasing the contact area with the fixation plate 124 to increase the attraction force may be provided to the step portion 24 of the body portion 20 of the ejector pin 10, thereby enhancing the attraction force with the fixation plate 124. In the present embodiment, as the magnet, a rubber magnet, a plastic magnet, an electromagnet, or the like can be used. This applies also to the embodiments described later. A rubber magnet and a plastic magnet have an advantage of being resistant to shock, though the attraction force thereof is comparatively small.

Instead of the fixation plate 124 which performs attraction by a magnetic force, the retaining unit of the present invention may be used. In this case, for example, instead of the fixation plate 124, the ring-shaped member 11 or an equivalent member may be fixed to the movable-side die plate 113, and ball plungers 12 to be fitted to a recess 23 of a ring-shaped member 11 or the like provided instead of the fixation plate 124 may be provided in the outer circumferential surface on the distal end side of the body portion 20 of the ejector pin 10.

As described above, in the retaining unit 1 of the present embodiment, the retaining mechanism is unitized, and therefore, the retaining unit 1 can be easily incorporated into the mold such as the injection mold 100 and has high usability. In addition, according to the retaining unit 1 of the present embodiment, the ball plungers 12 forming the pressing unit for engaging the ejector pin 10 (fixing member 22) which is the first member with the ring-shaped member 11 which is the second member, are attachable and detachable with respect to the fixing member 22, and the pressing force is adjustable in a state in which the ball plungers 12 are incorporated into the fixing member 22. Therefore, the retaining unit 1 can be used by being incorporated into various molds and the like, and thus has high versatility. In addition, as in the injection mold 100 shown in the present embodiment, in the ejection mechanism, the recess 147 is provided to the ejector plate 141 and the ring-shaped member 11 which is the second member of the retaining unit 1 is attached to the recess 147, whereby the ejection mechanism of the forming mold, and the forming mold, can be made compact.

In addition, in the injection mold 100 of the present embodiment, the ejector pin 10, the stroke amount of which is mechanically (physically) restricted, and the ejector plate 141 are connected with each other via the ball plungers 12 incorporated into the fixing member 22, whereby movement of the ejector pin 10 and movement of the ejector plate 141 can be separated from each other, and thus movement of the ejector pin 10 and movement of the ejector plate 141 can be made independent of each other.

In addition, in the injection mold 100 shown in the present embodiment, the ball plungers 12 are used for connection between the ejector pin 10 and the ejector plate 141. Therefore, attachment and detachment between the ejector pin 10 and the ejector plate 141 can be achieved with a simple configuration. Accordingly, for the ejection mechanism 140, complicated components are not needed, the number of components is small, the structure thereof is simple, and assembly thereof is facilitated. Thus, the ejection mechanism 140 can be manufactured at low cost.

In the above embodiment, the stroke amount of the ejector pin 10 is restricted by the step portion 24 of the body portion 20 of the ejector pin 10. However, a restrictor for restricting the stroke amount of the ejector pin 10 is not limited to the above configuration.

In the injection mold 100 shown in the above embodiment, the number of the ejector pin 142 fixed to the ejector plate 141 and the number of the ejector pin 10 fixed detachably are each one. However, as is obvious from the above configuration, two or more of each pin may be mounted, and the stroke amounts of the respective ejector pins 10 may be different from each other. Even if the number of the ejector pins 10 fixed detachably is two or more, the number of the ejector plates 141 may be only one. Therefore, even in the case of an injection mold capable of multi-stage ejection, the size of the mold need not be enlarged.

In the above retaining unit 1, the ejector pin 10 which is the first member and the fixing member 22 for fixing the ball plungers 12 forming the pressing unit are separate bodies, and the fixing member 22 is attached to the lower end (bottom portion) of the ejector pin 10. However, the ejector pin 10 and the fixing member 22 may be formed integrally. This applies also to the other embodiments. Such an ejector pin can be said to be an ejector pin having an expanded portion at the bottom of the body portion 20.

As a modification of the above retaining unit 1, the ball plungers 12 which form the pressing unit may be directly attached to the body portion 20 of the ejector pin 10 which is the first member. The ring-shaped member 11 may be fixed in a state of being fitted into an attachment hole provided in the lower ejector plate 141b so as to penetrate therethrough. This applies also to the other embodiments.

Figure 6:
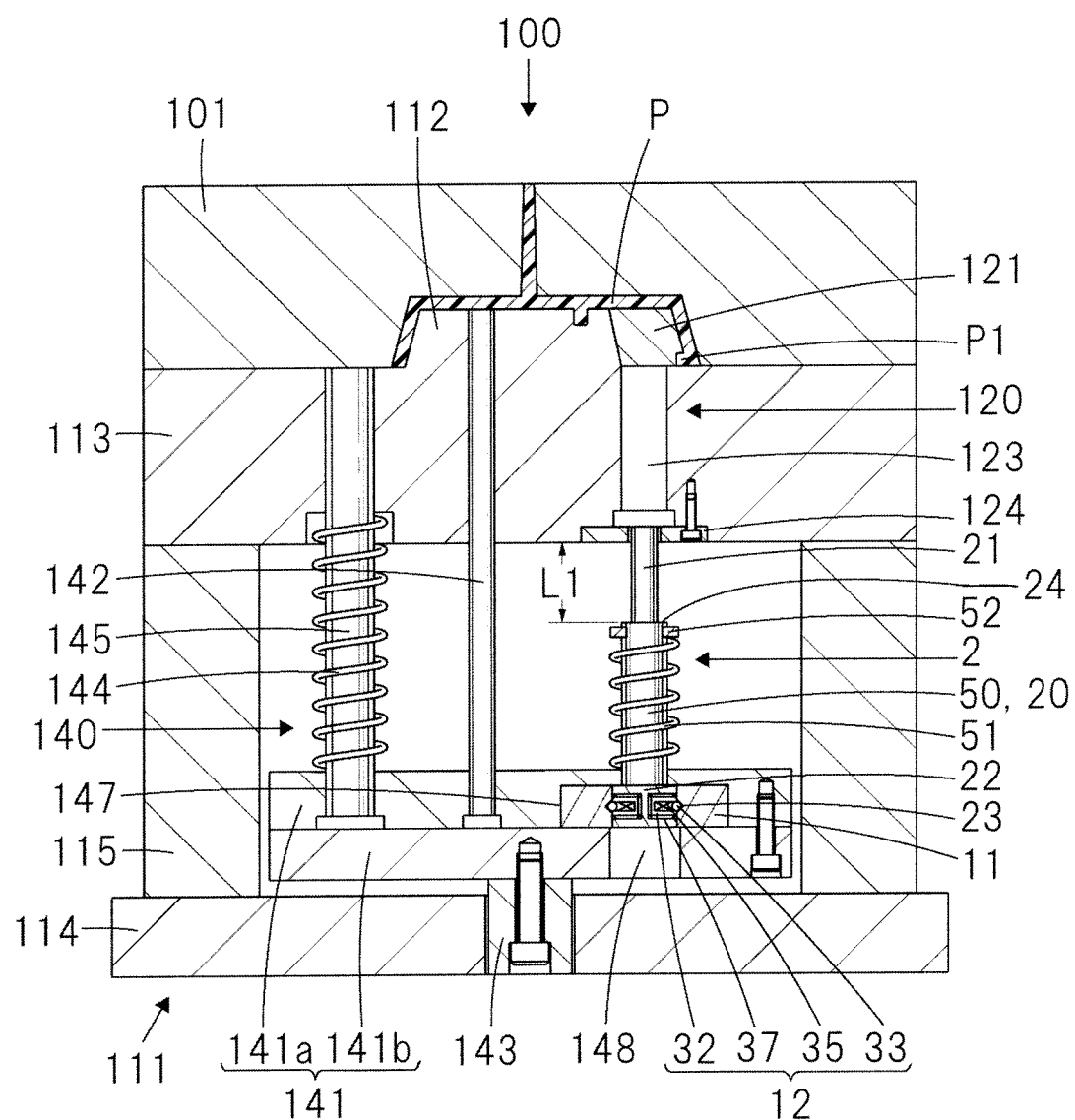
FIG. 6 is a sectional view of a main part of an injection mold 100 including a retaining unit 2 according to the second embodiment of the present invention, at the time of mold clamping.
Figure 7:
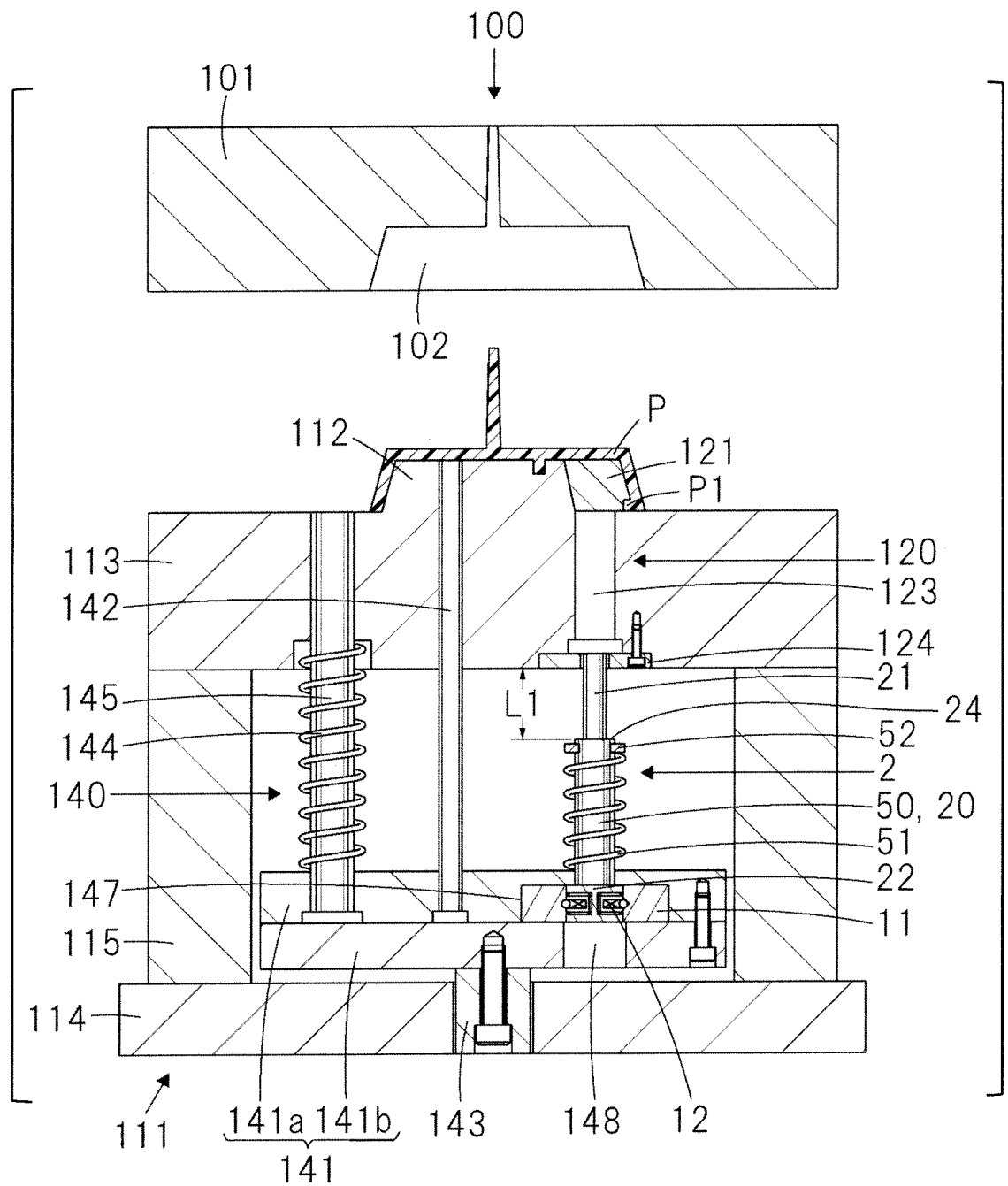
FIG. 7 is a sectional view of a main part of the injection mold 100 shown in FIG. 6 after mold opening.
Figure 8:
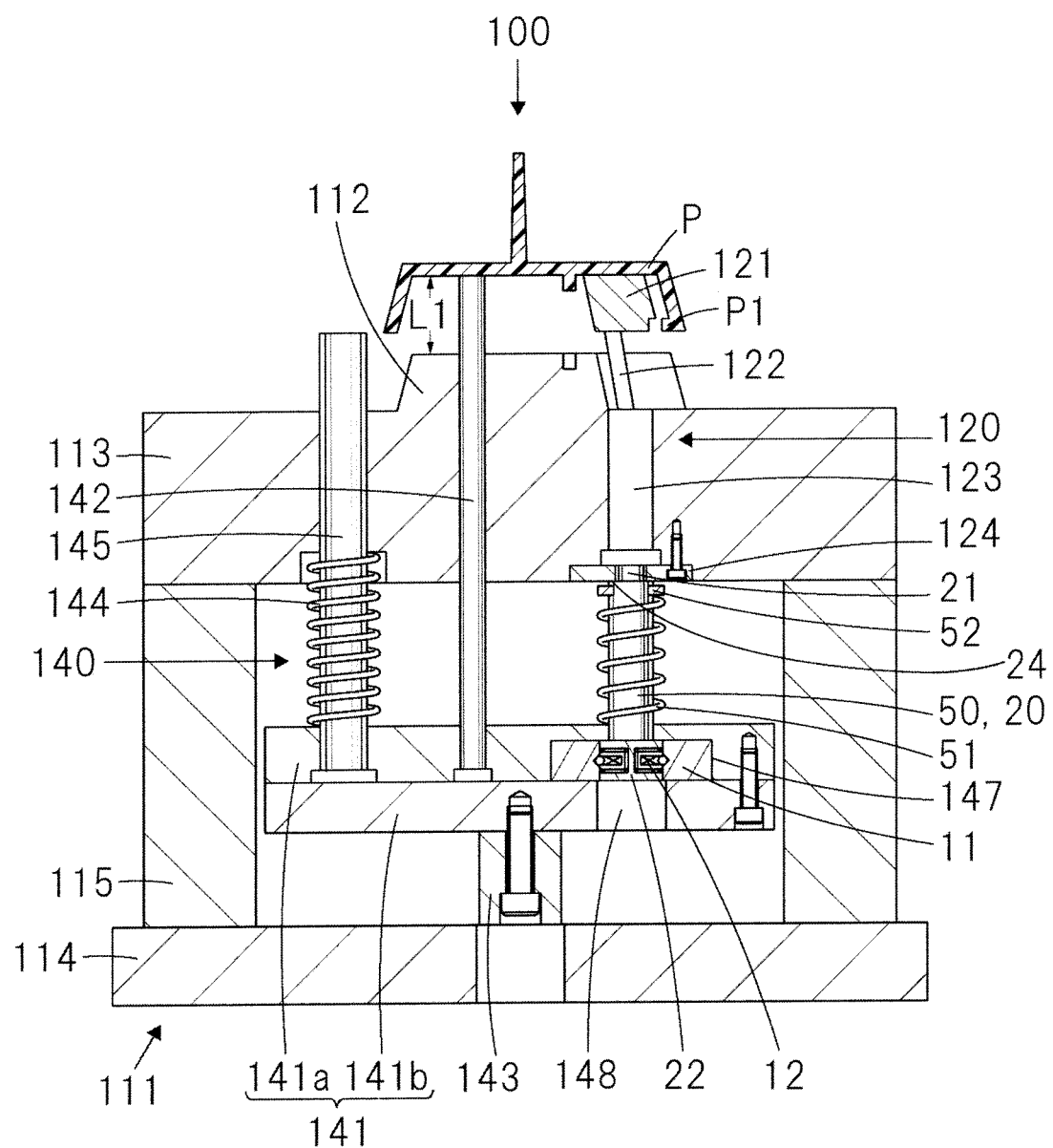
FIG. 8 is a sectional view of a main part of the injection mold 100 shown in FIG. 6 after ejection operation in a first stage.
Figure 9:
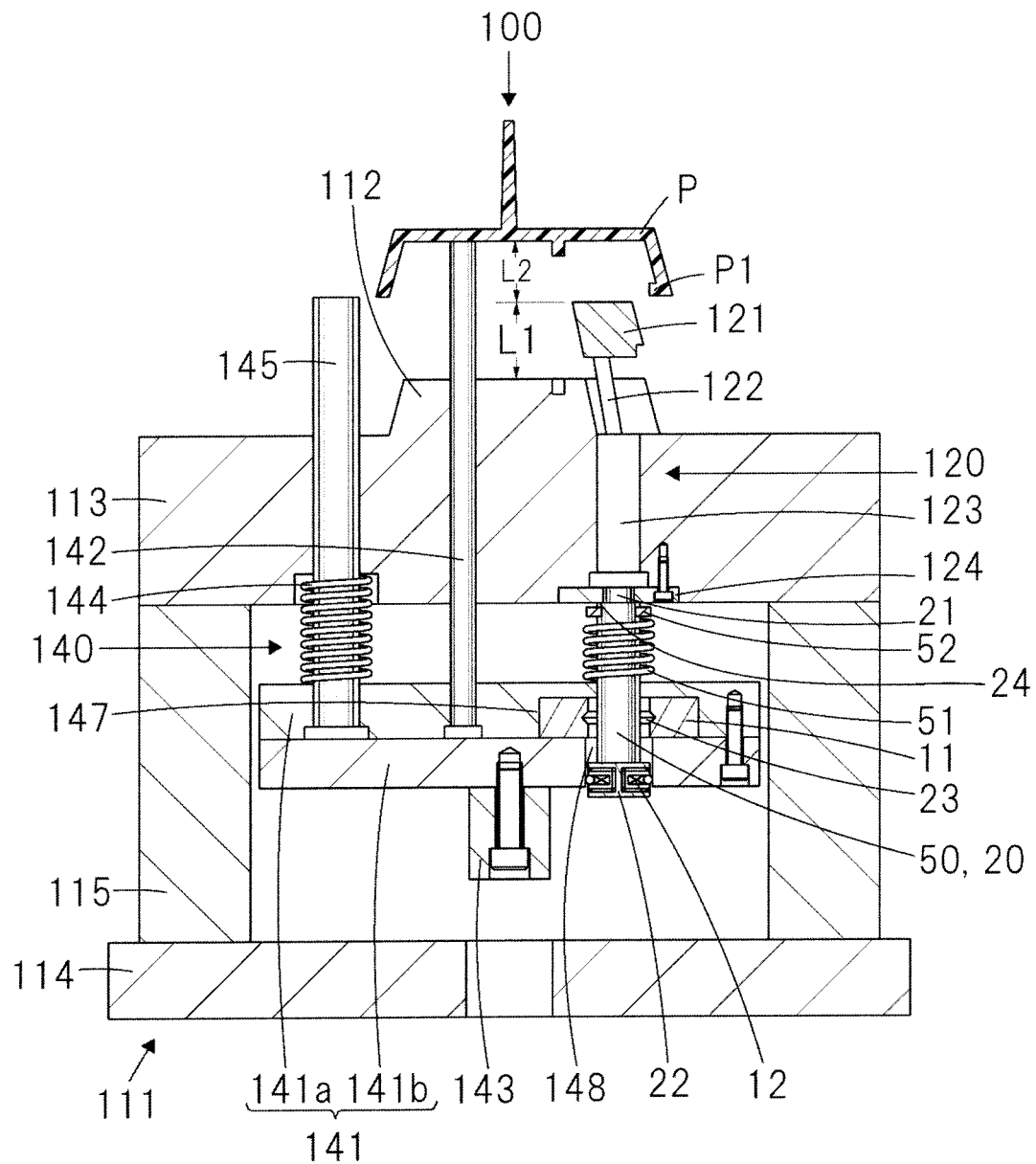
FIG. 9 is a sectional view of a main part of the injection mold 100 shown in FIG. 6 after ejection operation in a second stage.

FIG. 6 is a sectional view of a main part of an injection mold 100 including a retaining unit 2 according to the second embodiment of the present invention, at the time of mold clamping. FIG. 7 is a sectional view of a main part of the injection mold 100 shown in FIG. 6 after mold opening. FIG. 8 is a sectional view of a main part of the injection mold 100 shown in FIG. 6 after ejection operation in a first stage. FIG. 9 is a sectional view of a main part of the injection mold 100 shown in FIG. 6 after ejection operation in a second stage. In FIG. 8 and FIG. 9, the fixed-side die 101 is not shown. The same members as those of the injection mold 100 including the retaining unit 1 in the first embodiment shown in FIG. 1 to FIGS. 5A and 5B are denoted by the same reference characters, and the description thereof is omitted.

The retaining unit 2 of the present embodiment basically has the same configuration as the retaining unit 1 of the first embodiment, but includes a biasing unit for energizing an ejector pin 50 upward (upward direction in FIG. 6). The ejector pin 50 is formed by providing a spring receiver 52 to the outer circumference of the distal end of the body portion 20 of the ejector pin 10 in the first embodiment. A compression coil spring 51 is attached between the spring receiver 52 and the upper ejector plate 141a with the ejector pin 50 inserted therethrough, and energizes the ejector pin 50 upward.

The compression coil spring 51 prevents the ejector pin 50 from shaking when the ejector plate 141 is moved, and as in the stopper 13 (see FIG. 5A and FIG. 5B), has a function of pushing the fixing member 22 attached to the lower end of the ejector pin 50 to the upper ejector plate 141a side when the ejector plate 141 returns to a mold clamped state, thus assuredly engaging and connecting the fixing member 22 with the ring-shaped member 11.

Since the compression coil spring 51 is mounted to the ejector pin 50 in the second embodiment, a force acting on the ejector pin 50 is different from that on the ejector pin 10 in the first embodiment. Even in this case, the principles of a connection force, engagement, and disengagement between the fixing member 22 and the ring-shaped member 11 connected via the ball plungers 12 are the same as in the retaining unit 1 according to the first embodiment.

Other than the above, basic operation of the injection mold 100 at the time of ejecting a molded product and basic actions of the ejection mechanism 140 and the retaining unit 2 are the same as in the first embodiment, and therefore the description thereof is omitted.

Also in the present embodiment, as in the first embodiment, a stopper 13 may be provided to the movable-side attachment plate 114 so that the fixing member 22 attached to the lower end of the ejector pin 50 is assuredly connected with the ring-shaped member 11 when the ejector plate 141 is returned to a mold clamping position. Further, a compression coil spring 14 for energizing the fixing member 22 attached to the lower end of the ejector pin 50 toward the upper ejector plate 141a side may be attached to the stopper 13 (see FIG. 5A).

If the stopper 13 is provided, the fixing member 22 attached to the lower end of the ejector pin 50 is pushed by the distal end of the stopper 13 or the compression coil spring 14 when the ejector plate 141 is returned to the mold clamping position, and thus the balls 33 of the ball plungers 12 are assuredly fitted into the recess 23 of the ring-shaped member 11.

In addition, by using two compression coil springs 14, 51, i.e., the compression coil spring 51 attached to the body portion 20 of the ejector pin 50 and the compression coil spring 14 (see FIG. 5A) attached to the stopper 13, it is possible to stably maintain the ejection force of the ejector pin 50 throughout a period from the initial stage to the final stage of the ejection step. At the initial stage of the ejection step, the spring reaction force of the compression coil spring 14 on the stopper 13 side, which spring 14 is in a compressed state, can be efficiently utilized. As the ejection step progresses, the compression coil spring 14 on the stopper 13 side extends and the spring reaction force thereof decreases, but at this time, the compression coil spring 51 on the body portion 20 side contracts and the spring reaction force thereof increases. Thus, a high ejection force can be maintained also at the final stage of the ejection step.

Figure 10:
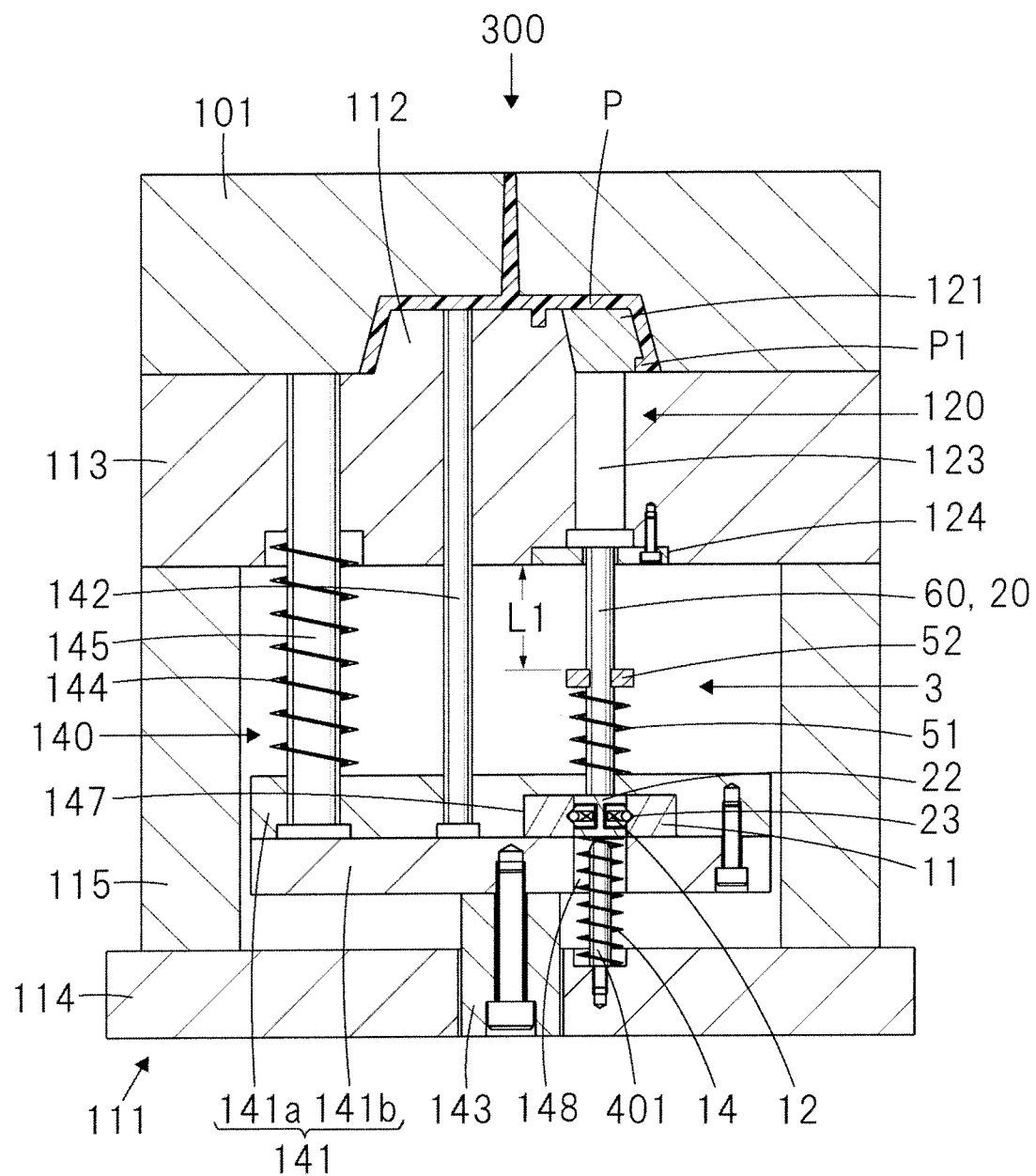
FIG. 10 is a sectional view of a main part of an injection mold 300 including a retaining unit 3 according to the third embodiment of the present invention, at the time of mold clamping.
Figure 11:
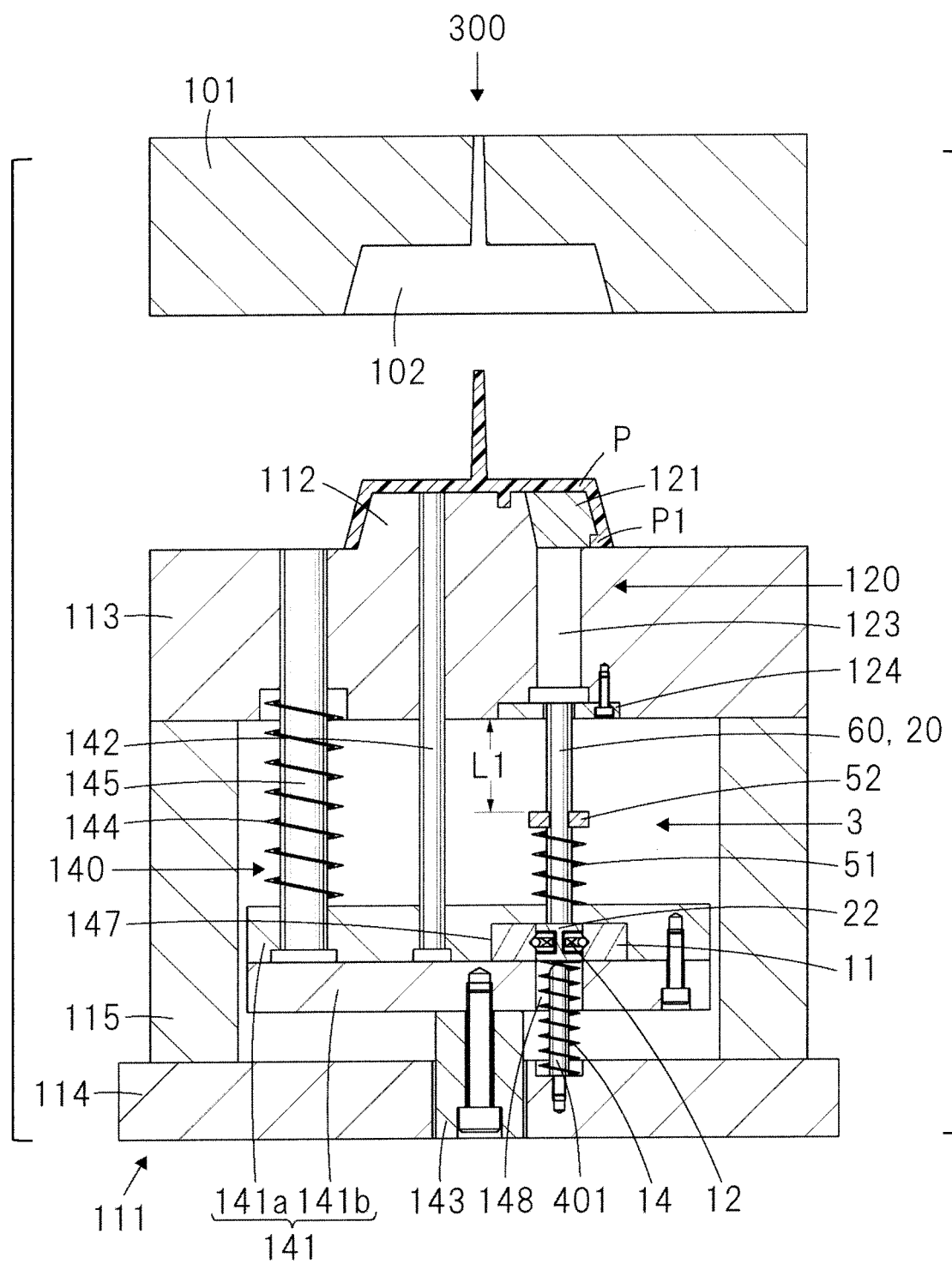
FIG. 11 is a sectional view of a main part of the injection mold 300 shown in FIG. 10 after mold opening.
Figure 12:
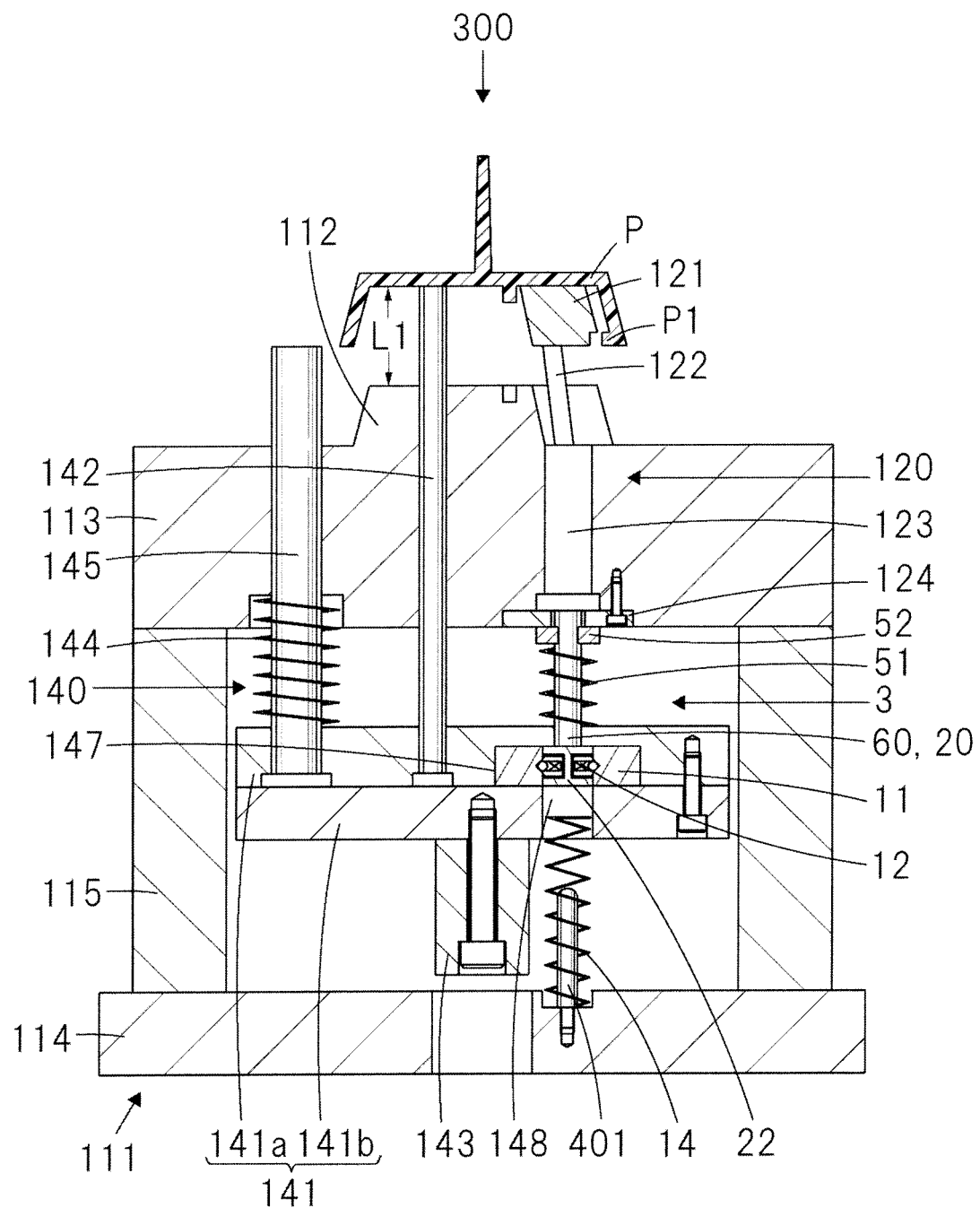
FIG. 12 is a sectional view of a main part of the injection mold 300 shown in FIG. 10 after ejection operation in a first stage.
Figure 13:
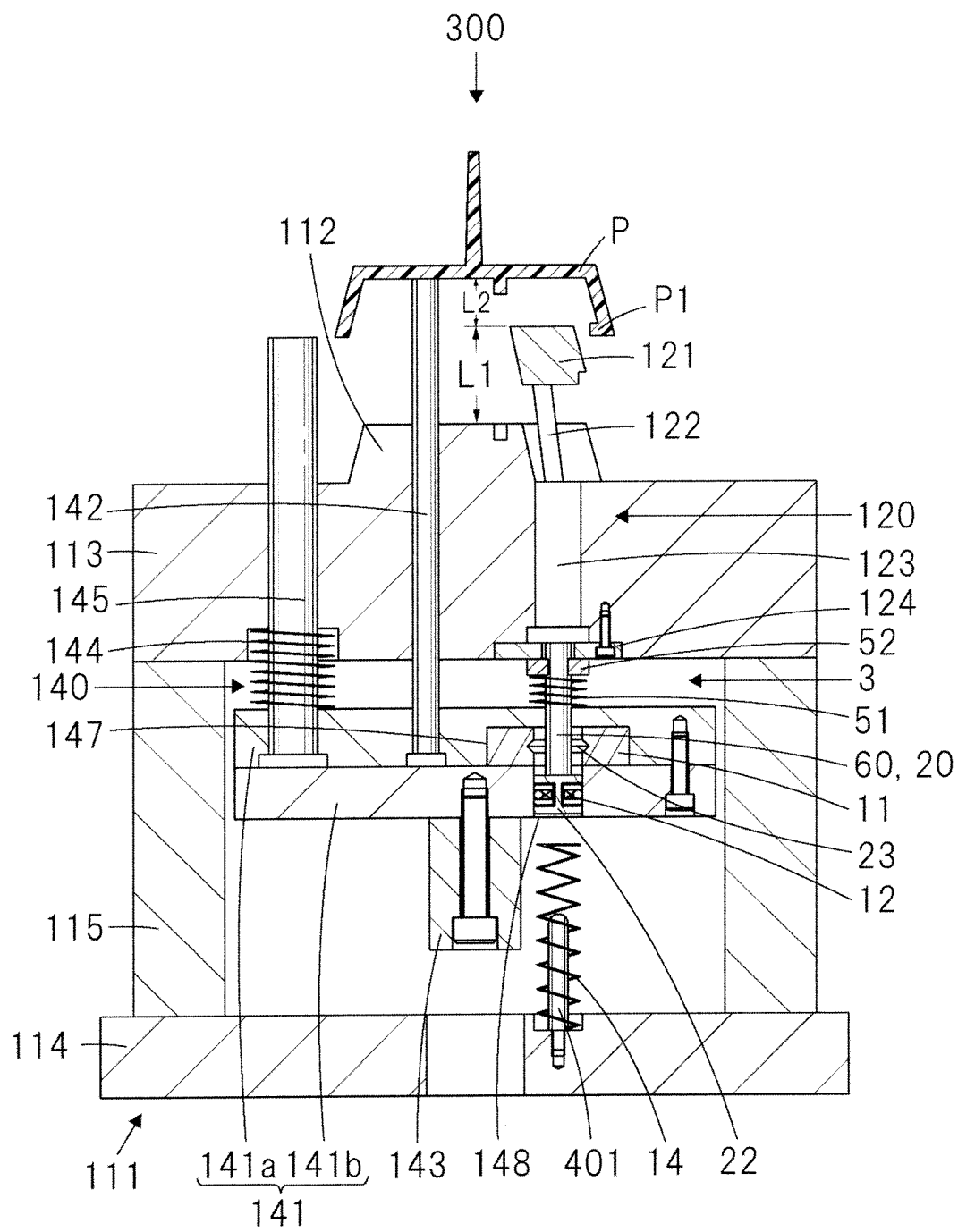
FIG. 13 is a sectional view of a main part of the injection mold 300 shown in FIG. 10 after ejection operation in a second stage.

FIG. 10 is a sectional view of a main part of an injection mold 300 including a retaining unit 3 according to the third embodiment of the present invention, at the time of mold clamping. FIG. 11 is a sectional view of a main part of the injection mold 300 shown in FIG. 10 after mold opening. FIG. 12 is a sectional view of a main part of the injection mold 300 shown in FIG. 10 after ejection operation in a first stage. FIG. 13 is a sectional view of a main part of the injection mold 300 shown in FIG. 10 after ejection operation in a second stage. In FIG. 12 and FIG. 13, the fixed-side die 101 is not shown. The same members as those of the injection mold 100 including the retaining unit 2 in the second embodiment shown in FIG. 6 to FIG. 9 are denoted by the same reference characters, and the description thereof is omitted.

The retaining unit 3 of the present embodiment is the same as the retaining unit 2 of the second embodiment except that an ejector pin 60 does not have a step portion 24. The retaining unit 3 of the present embodiment performs abutting on the fixation plate 124 and attraction thereto, using a spring receiver 52.

In the injection mold 300 shown in the present embodiment, the compression coil spring 14 is attached to the movable-side attachment plate 114. However, in the injection mold 300 shown in the present embodiment, a guide pin 401 for the compression coil spring 14 is provided instead of the stopper 13, and the guide pin 401 does not directly push the ejector pin 60.

Operation of the injection mold 300 including the retaining unit 3 of the present embodiment at the time of ejecting a molded product, and actions of the ejection mechanism 140 and the retaining unit 3, will be described. Hereinafter, for convenience sake, the compression coil spring 51 on the body portion 20 side of the ejector pin 60 is referred to as an upper spring 51, and the compression coil spring 14 on the movable-side attachment plate 114 side is referred to as a lower spring 14. The upper spring 51 and the lower spring 14 both act so as to energize the fixing member 22 attached to the lower end of the ejector pin 60 of the retaining unit 3 toward the upper ejector plate 141a side (upward in FIG. 10).

In mold clamping (from injection step to cooling step), the upper spring 51 is extended most among all the steps from the injection step to the ejection step, and the lower spring 14 is contracted most among all the steps (see FIG. 10). Therefore, the upper spring 51 energizes the fixing member 22 attached to the lower end of the ejector pin 60 by a comparatively small force, and the lower spring 14 energizes the fixing member 22 by a comparatively great force. The same applies also after mold opening (see FIG. 11).

In the ejection step, as the ejector plate 141 advances, the lower spring 14 extends and the spring reaction force thereof decreases. When the ejector plate 141 is ejected by the distance L1, the spring receiver 52 of the ejector pin 60 abuts on the fixation plate 124, whereby movement of the ejector pin 60 is prevented (see FIG. 12). At this time, the lower spring 14 is apart from the fixing member 22 attached to the lower end of the ejector pin 60 and the spring reaction force of the lower spring 14 is zero, but the spring reaction force of the upper spring 51 is maintained.

Hereafter, the movement of the ejector pin 60 is stopped, while the ejector plate 141 continues advancing. Thus, the upper spring 51 is compressed and the spring reaction force thereof increases. When the ejector pin 142 is maximally ejected, the upper spring 51 is contracted most among all the steps, and thus the spring reaction force of the upper spring 51 is maximized (see FIG. 13).

As described above, at the initial stage of the ejection step, the spring reaction force of the lower spring 14 in a compressed state can be efficiently utilized, and then, as the ejection step progresses, the lower spring 14 extends and the spring reaction force thereof decreases, but at this time, the upper spring 51 contracts and the spring reaction force thereof increases. Therefore, a high ejection force of the ejector pin 60 can be maintained throughout a period from the initial stage to the final stage of the ejection step.

Since the compression coil spring 51 is mounted to the ejector pin 60 in the third embodiment and further the compression coil spring 14 is attached to the movable-side attachment plate 114, a force acting on the ejector pin 60 is different from that on the ejector pin 10 in the first embodiment. Even in this case, the principles of a connection force, engagement, and disengagement between the fixing member 22 and the ring-shaped member 11 connected via the ball plungers 12 are the same as in the retaining unit 1 according to the first embodiment.

Other than the above, basic operation of the injection mold 300 at the time of ejecting a molded product and basic actions of the ejection mechanism 140 and the retaining unit 3 are the same as in the first embodiment, and therefore the description thereof is omitted.

Figure 14:
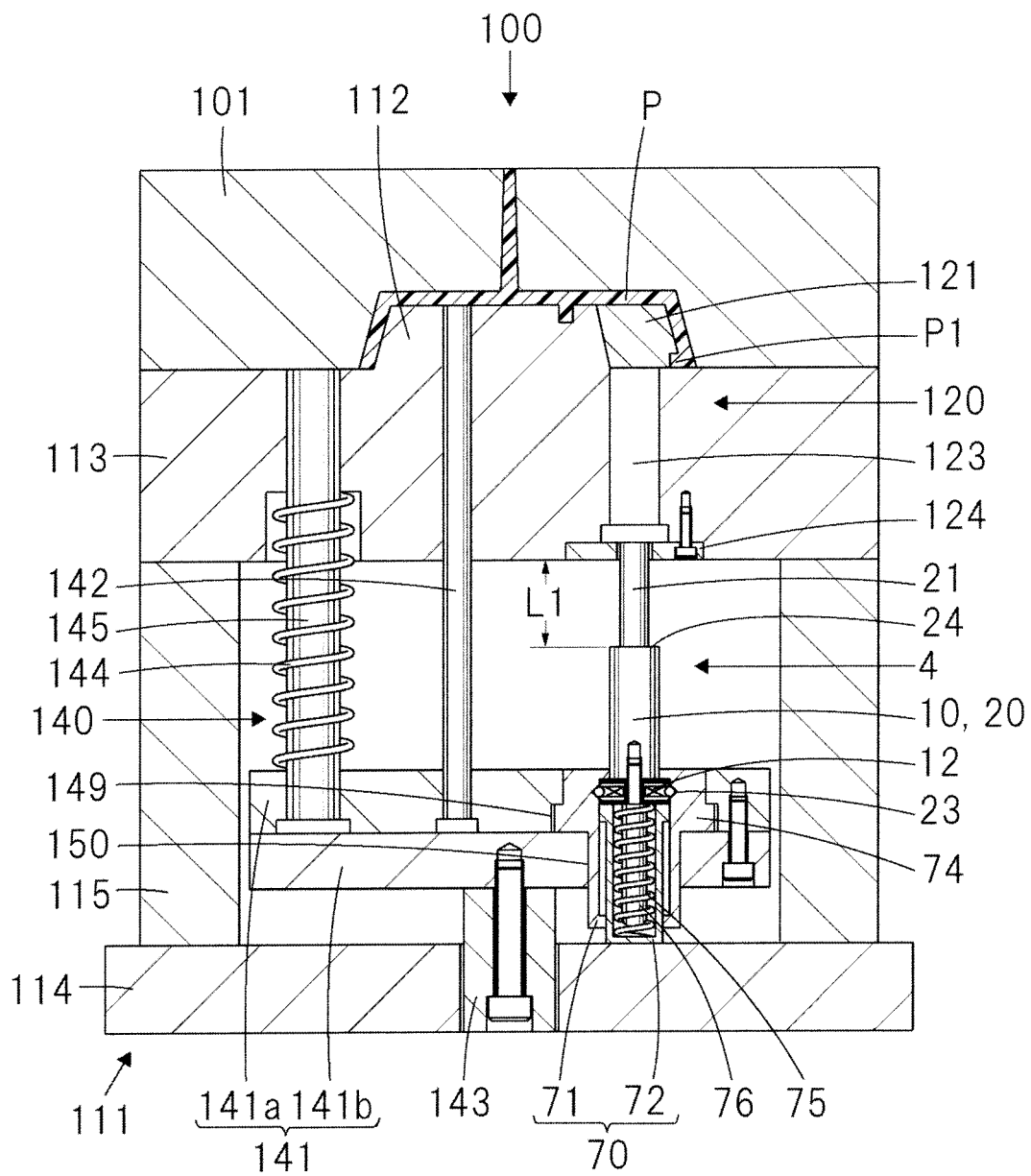
FIG. 14 is a sectional view of a main part of an injection mold 100 including a retaining unit 4 according to the fourth embodiment of the present invention, at the time of mold clamping.
Figure 15:
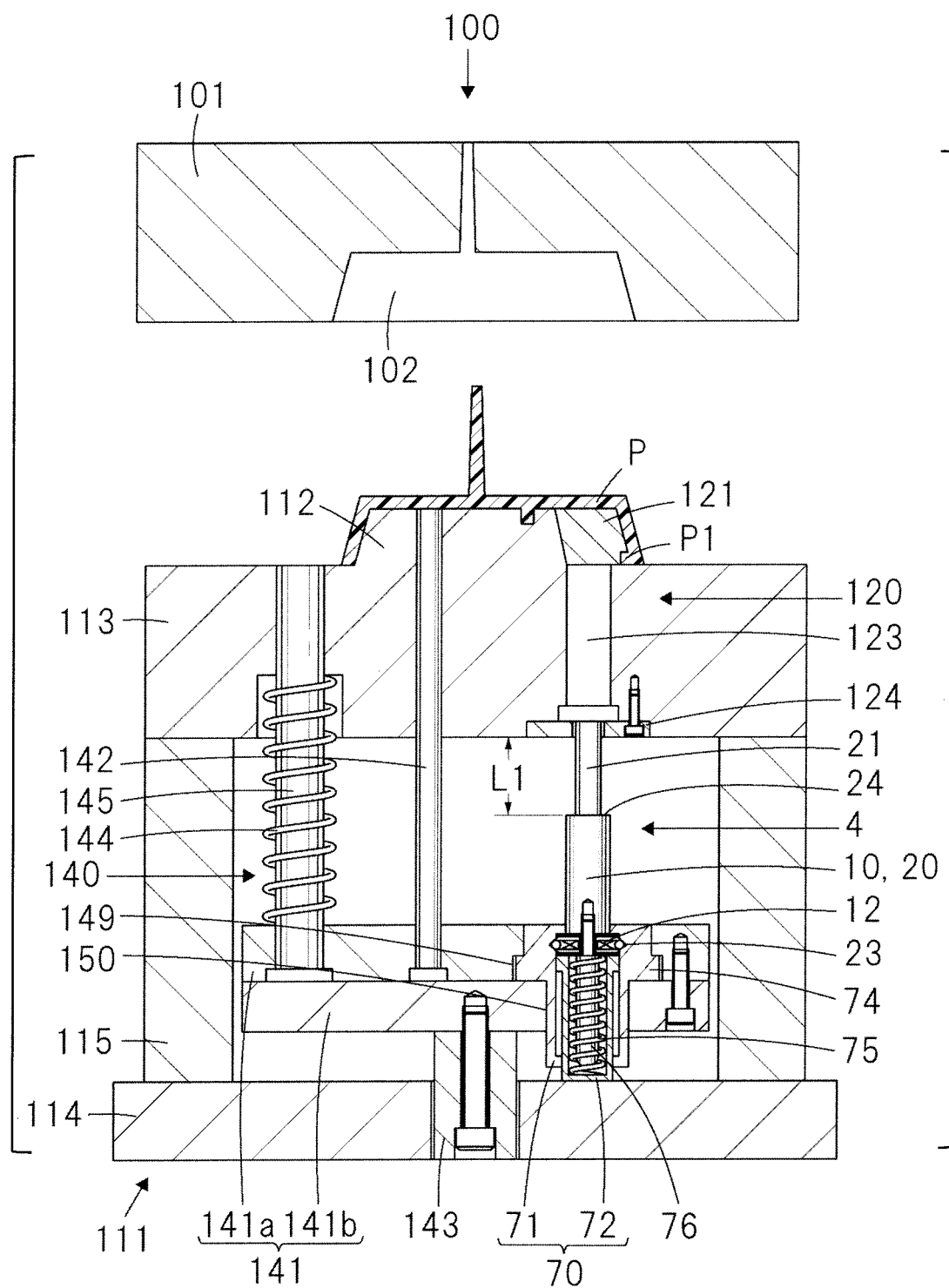
FIG. 15 is a sectional view of a main part of the injection mold 100 shown in FIG. 14 after mold opening.
Figure 16:
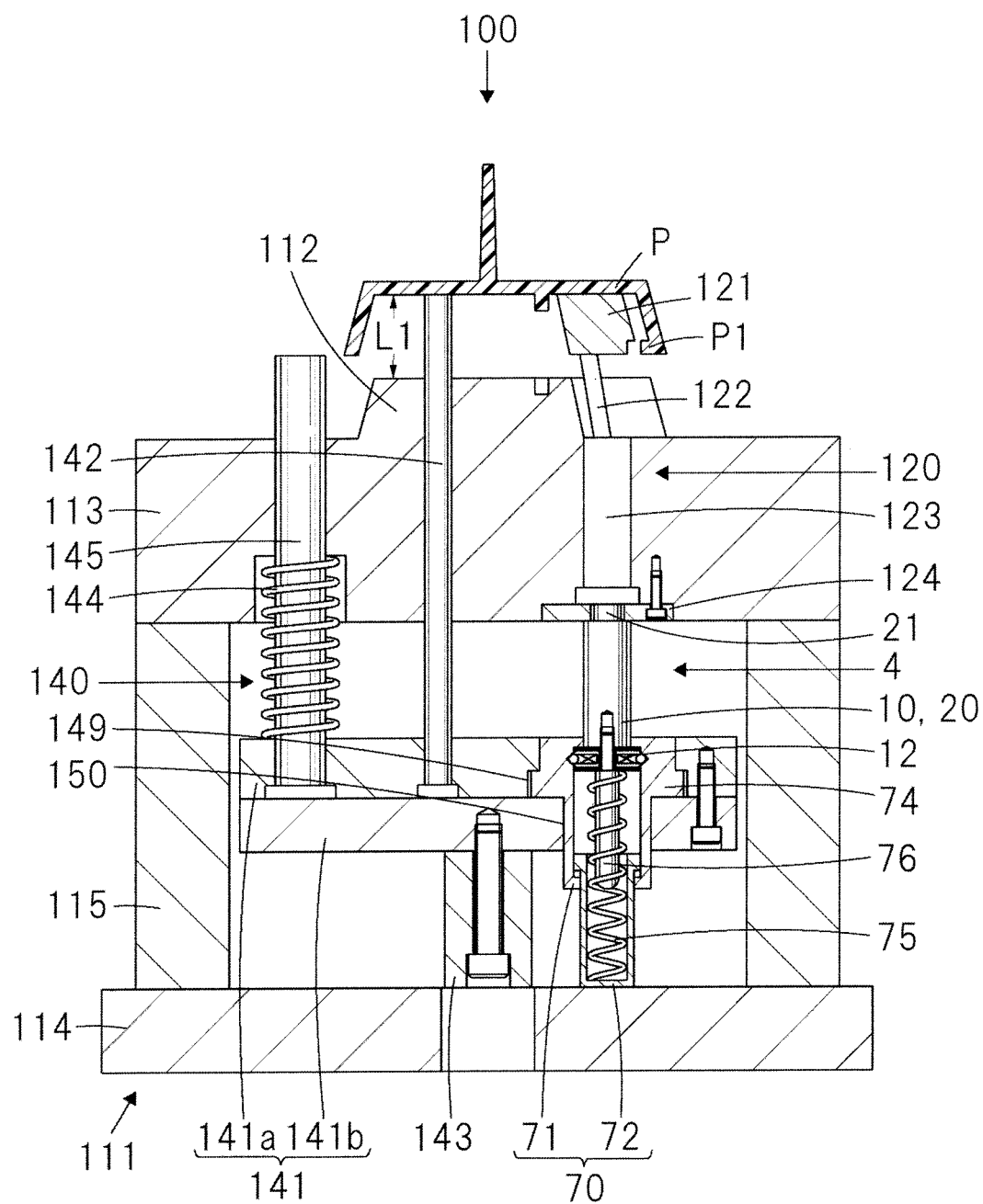
FIG. 16 is a sectional view of a main part of the injection mold 100 shown in FIG. 14 after ejection operation in a first stage.
Figure 17:
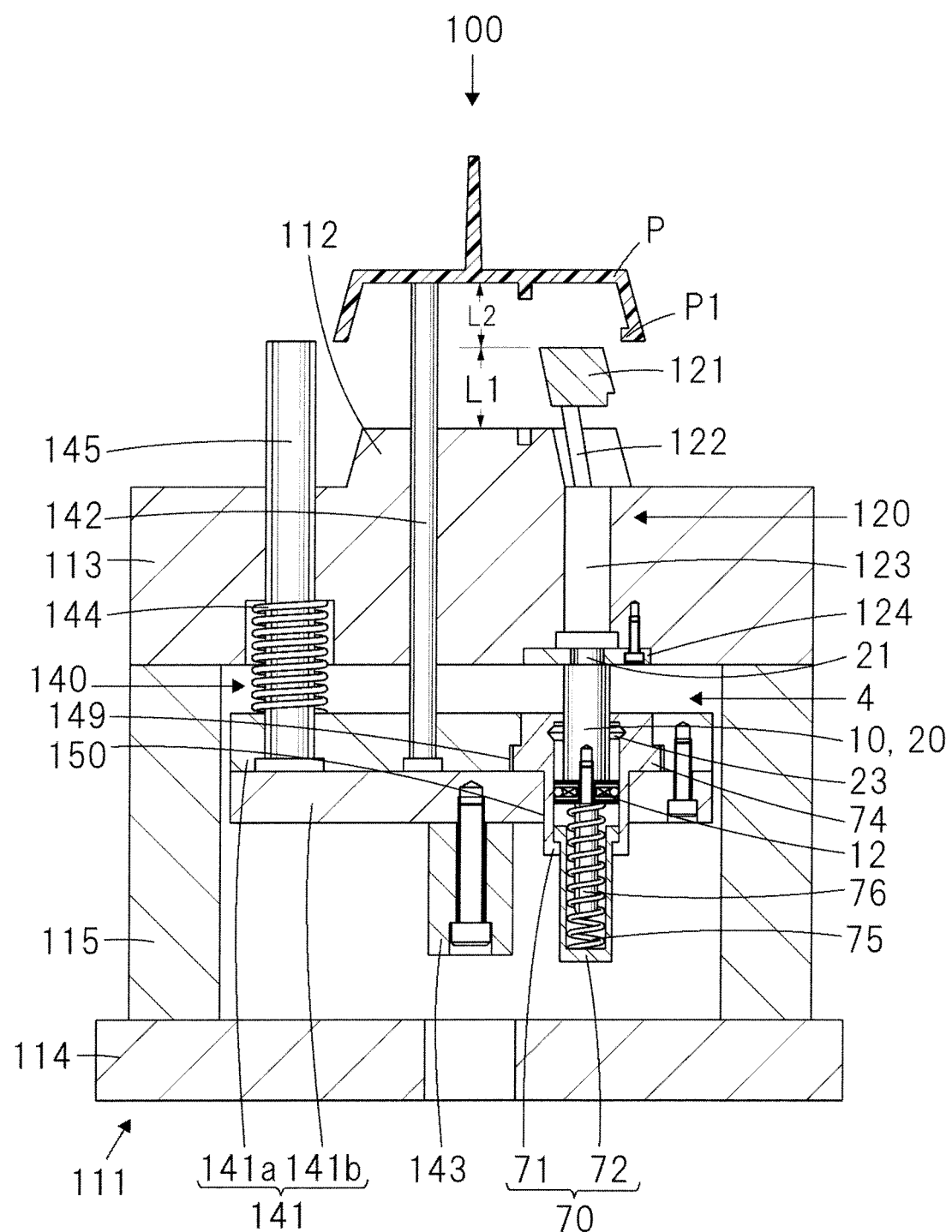
FIG. 17 is a sectional view of a main part of the injection mold 100 shown in FIG. 14 after ejection operation in a second stage.

FIG. 14 is a sectional view of a main part of an injection mold 100 including a retaining unit 4 according to the fourth embodiment of the present invention, at the time of mold clamping. FIG. 15 is a sectional view of a main part of the injection mold 100 shown in FIG. 14, after mold opening. FIG. 16 is a sectional view of a main part of the injection mold 100 shown in FIG. 14, after ejection operation in a first stage. FIG. 17 is a sectional view of a main part of the injection mold 100 shown in FIG. 14, after ejection operation in a second stage. In FIG. 16 and FIG. 17, the fixed-side die 101 is not shown. The same members as those of the injection mold 100 including the retaining unit 1 in the first embodiment shown in FIG. 1 to FIG. 4 are denoted by the same reference characters, and the description thereof is omitted.

The retaining unit 4 of the present embodiment basically has the same configuration as the retaining unit 1 of the first embodiment, but includes a holder 70 that houses the compression coil spring in an extendable and contractible manner. The holder 70 includes a cylindrical outer holder 71 fixed to the ejector plate 141, and a bottomed cylindrical inner holder 72 which is located inside the outer holder 71 and slidably engaged with the outer holder 71.

The holder 70 is attached to the ejector plate 141 such that the center axis thereof coincides with the center axis of the ejector pin 10 of the retaining unit 4. The upper ejector plate 141a has a recess 149 into which the flange 74 of the outer holder 71 is fitted, and the lower ejector plate 141b has a through hole 150 through which the outer holder 71 is inserted. The flange 74 of the outer holder 71 is fixed by being sandwiched between the upper ejector plate 141a and the lower ejector plate 141b.

In the retaining unit 4 of the present embodiment, instead of the ring-shaped member 11, the outer holder 71 functions as a ring-shaped member which is the second member. The fixing member 22 attached to the lower end of the ejector pin 10 is movable in the up-down direction inside the outer holder 71. As in the ring-shaped member 11 of the retaining unit 1 of the first embodiment, an upper inner surface of the outer holder 71 has a recess 23 into which the ball plungers 12 are fitted, and the ejector pin 10 is detachably connected with the outer holder 71 via the ball plungers 12 fixed to the fixing member 22 attached to the lower end of the ejector pin 10.

A compression coil spring 75 is housed in the inner holder 72, and the compression coil spring 75 has both functions of the upper spring 51 and the lower spring 14 of the third embodiment. A guide pin 76 for the compression coil spring 75 is provided to the ejector pin 10 so as to stand from the bottom surface of the fixing member 22.

In the retaining unit 4 of the present embodiment, the bottom surface of the inner holder 72 and the bottom surface of the fixing member 22 attached to the lower end of the ejector pin 10 serve as pressure receiving surfaces against the compression coil spring 75, the compression coil spring 75 energizes the fixing member 22 upward, thereby maintaining the ejection force of the ejector pin 10, and the inner holder 72 slides in the center axis direction on the outer holder 71 in accordance with extension/contraction of the compression coil spring 75, whereby the holder 70 extends or contracts as a whole.

Since a force of the compression coil spring 75 acts on the ejector pin 10 in the fourth embodiment, a force acting on the ejector pin 10 in the fourth embodiment is different from that on the ejector pin 10 in the first embodiment. Even in this case, the principles of a connection force, engagement, and disengagement between the fixing member 22 and the outer holder 71 serving as a ring-shaped member, both of which are connected via the ball plungers 12, are the same as in the retaining unit 1 according to the first embodiment.

Operation of the injection mold 100 including the retaining unit 4 of the present embodiment at the time of ejecting a molded product, and actions of the ejection mechanism 140 and the retaining unit 4, will be described. In mold clamping (from injection step to cooling step), the bottom surface of the inner holder 72 is in contact with the movable-side attachment plate 114, and the distal end surface of the inner holder 72 is in contact with the bottom surface of the fixing member 22 attached to the lower end of the ejector pin 10 (see FIG. 14). Thus, the fixing member 22 is assuredly connected with the outer holder 71 via the ball plungers 12.

As shown in FIG. 15 and FIG. 16, in the ejection step after mold opening, as the ejector plate 141 advances, the inner holder 72 slides on the outer holder 71 by the spring reaction force of the compression coil spring 75, and the compression coil spring 75 and the holder 70 extend as a whole, and thus, the spring reaction force of the compression coil spring 75 gradually decreases. When the ejector plate 141 is ejected by the distance L1, the step portion 24 of the ejector pin 10 abuts on the fixation plate 124 (see FIG. 16).

When the ejector plate 141 further advances, the fixing member 22 attached to the lower end of the ejector pin 10 is detached from the recess 23 of the outer holder 71, and the ejector plate 141 advances while leaving the ejector pin 10 (see FIG. 17). As the ejector plate 141 further advances while the ejector pin 10 stays at rest, the distance between the bottom surface of the fixing member 22 and the bottom surface of the inner holder 72 which form pressure receiving surfaces against the compression coil spring 75 is shortened, whereby the spring reaction force of the compression coil spring 75 is gradually increased again.

As described above, with the retaining unit 4 of the present embodiment, the spring reaction force of the compression coil spring 75 in a compressed state can be efficiently utilized at the initial stage of the ejection step. As the ejection step progresses, the compression coil spring 75 once extends and the spring reaction force thereof decreases, but the compression coil spring 75 contracts again and the spring reaction force thereof increases. Therefore, a high ejection force of the ejector pin 10 can be maintained throughout a period from the initial stage to the final stage of the ejection step.

Thus, using the retaining units 1 to 4 of the first to fourth embodiments, the retaining unit of the present invention, the ejection mechanism of the forming mold including the retaining unit, the fixed-side die, the movable-side die, the forming mold, and the molded product, have been described. However, the retaining unit of the present invention, the ejection mechanism of the forming mold including the retaining unit, the fixed-side die, the movable-side die, the forming mold, and the molded product are not limited to the above embodiments, but may be used while being modified within a range that does not deviate from the gist. For example, the retaining unit of the present invention is not limited to such usage as to be incorporated as a part of the ejection mechanism of the forming mold, but may be used for a simple lock mechanism and the like. Thus, the configuration and the shape thereof may be modified as appropriate in accordance with the intended usage.

In the retaining unit of the present invention, the pressing unit for engaging the first member with the second member is not limited to the ball plungers 12 described in the above embodiments. Instead of the ball plungers 12, a plate spring, an elastic body having, at a distal end, an engagement portion to be engaged with the ring-shaped member 11 or the recess 23 of the outer holder 71, or the like may be used. The elastic body in this case may be other than a spring.

In the retaining unit of the present invention, the first member having the pressing unit may be fixed in an unmovable state, and the second member may be movable. In the retaining unit of the present invention, the ejection mechanism of the forming mold including the retaining unit, the fixed-side die, the movable-side die, and the forming mold, a corner and a side edge of each component may be, for example, rounded or chamfered.

The materials of the constituent members used for the retaining unit of the present invention, the ejection mechanism of the forming mold including the retaining unit, the fixed-side die, the movable-side die, and the forming mold are not limited to specific materials, but the same materials as those of members used for known undercut processing mechanisms and forming molds may be used as appropriate. However, the sliding surface of each constituent member is preferably formed from a material having a good slidability or a material that has been subjected to surface treatment so as to have a good slidability. Contact between the sliding surfaces is not limited to surface contact, but may be line contact or point contact.

The ejection mechanism of the forming mold including the retaining unit of the present invention, the fixed-side die, and the movable-side die are applicable to a forming mold that opens/closes in the horizontal direction, the vertical direction, or another direction.

The retaining unit of the present invention, the ejection mechanism of the forming mold including the retaining unit, the fixed-side die, the movable-side die, and the forming mold can be suitably used for a forming mold such as a die-casting mold, a mold press forming mold, and the like, other than the injection mold.

Although the present invention has been fully described in connection with the preferred embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1, 2, 3, 4 . . . retaining unit
10, 50, 60 . . . ejector pin
11 . . . ring-shaped member
12 . . . ball plunger
14, 51, 75 . . . compression coil spring
20 . . . body portion
22 . . . fixing member
23 . . . recess
33 . . . ball
37 . . . outer circumferential surface
70 . . . holder
71 . . . outer holder
72 . . . inner holder
100, 300 . . . injection mold
101 . . . fixed-side die
111 . . . movable-side die
113 . . . movable-side die plate
120 . . . undercut processing mechanism
140 . . . ejection mechanism
141 . . . ejector plate
142 . . . ejector pin
147 . . . recess
P . . . molded product

What is claimed is:

1. An ejection mechanism of a forming mold configured to form a molded product by use of a fixed-side die and a movable-side die, the ejection mechanism comprising:
   an ejector plate; and
   a retaining unit comprising:
      a first member configured to be movable, to function as an ejector pin, and to push out an undercut processing mechanism of the forming mold;
      a second member used in a fixed state and fixed to the ejector plate; and
      a pressing unit directly attached to the first member or fixed to a fixing member attached to the first member, the pressing unit being configured to press the second member and engage the first member with the second member, wherein the pressing unit is configured to release the engagement with the second member so that the first member is allowed to move, when a force at a predetermined level or higher is applied to the first member in a movement direction of the first member, and the pressing unit is incorporated into the first member or the fixing member so as to be unitized together.

2. The ejection mechanism as claimed in claim 1, wherein the second member has a recess into which at least a distal end portion of the pressing unit is fitted, and the pressing unit presses the second member with at least the distal end portion thereof fitted into the recess.

3. The ejection mechanism as claimed in claim 1, wherein the pressing unit is detachably incorporated into the first member or the fixing member.

4. The ejection mechanism as claimed in claim 1, wherein the pressing unit is configured such that a pressing force thereof to the second member is adjustable in a state in which the pressing unit is incorporated into the first member or the fixing member.

5. The ejection mechanism as claimed in claim 4, wherein the pressing unit is incorporated into the first member or the fixing member via a fixture, and the fixture functions to adjust the pressing force of the pressing unit.

6. The ejection mechanism as claimed in claim 1, wherein the fixing member is larger in outer diameter than the first member.

7. The ejection mechanism as claimed in claim 1, wherein the second member is a ring-shaped member provided so as to surround a pressed portion of the first member or the fixing member, one or more of the pressing unit are incorporated into the first member or the fixing member, and each pressing unit is configured such that a distal end portion thereof is projectable from an outer circumferential surface of the first member or the fixing member.

8. The ejection mechanism as claimed in claim 1, wherein the pressing unit is a ball plunger, a plate spring, or an elastic body that has a distal end provided with an engagement portion to be engaged with the second member.

9. The ejection mechanism of the forming mold as claimed in claim 1, further comprising one or a plurality of biasing unit configured to energize the first member toward a position where the first member is engaged with the second member, wherein the ejector plate has a recess into which the second member is fitted, and the second member is fixedly fitted into the recess.

10. The ejection mechanism of the forming mold as claimed in claim 9, further comprising a holder which houses the biasing unit, wherein the holder has: an outer holder attached to the movable-side die or the ejector plate; and an inner holder slidably engaged with the outer holder, and the holder restricts a sliding amount of the inner holder relative to the outer holder, thereby to restrict an extension amount of the biasing unit within a predetermined range.

11. The ejection mechanism of the forming mold as claimed in claim 1, wherein the first member is configured such that, when the ejector plate is moved to a predetermined position, the first member is connected with a movable-side die plate and is kept at the predetermined position.

12. An ejection mechanism of a forming mold configured to form a molded product by use of a fixed-side die and a movable-side die, the ejection mechanism comprising:

an ejector plate;

a retaining unit comprising:
- a first member configured to be movable, to function as an ejector pin, and to push out an undercut processing mechanism of the forming mold;
- a second member used in a fixed state and fixed to the ejector plate; and
- a pressing unit directly attached to the first member or fixed to a fixing member attached to the first member, the pressing unit being configured to press the second member and engage the first member with the second member, wherein the pressing unit is configured to release the engagement with the second member so that the first member is allowed to move, when a force at a predetermined level or higher is applied to the first member in a movement direction of the first member, and the pressing unit is incorporated into the first member or the fixing member so as to be unitized together; and in addition to the first member configured to function as the ejector pin, one or more ejector pins fixed to the ejector plate or comprising a plurality of the retaining units incorporated into the ejector plate, wherein the ejection mechanism of the forming mold is capable of multi-stage ejection.

13. A fixed-side die and/or a movable-side die, comprising the ejection mechanism of the forming mold as claimed in claim 1.

14. A forming mold comprising the fixed-side die and/or the movable-side die as claimed in claim 13.

15. The ejection mechanism of the forming mold as claimed in claim 1, wherein the ejector pin contacts with or is fitted to a moving member in the molded product or the forming mold.

\* \* \* \* \*